(12) United States Patent
Emura et al.

(10) Patent No.: US 11,740,401 B2
(45) Date of Patent: Aug. 29, 2023

(54) METHOD OF MANUFACTURING LIGHT EMITTING MODULE

(71) Applicant: NICHIA CORPORATION, Anan (JP)

(72) Inventors: Keiji Emura, Anan (JP); Takuya Nakabayashi, Tokushima (JP); Toru Hashimoto, Tokushima (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 17/446,505

(22) Filed: Aug. 31, 2021

(65) Prior Publication Data

US 2022/0066088 A1 Mar. 3, 2022

(30) Foreign Application Priority Data

Aug. 31, 2020 (JP) .................................. 2020-145938
Mar. 9, 2021 (JP) .................................. 2021-037653

(51) Int. Cl.
*F21V 8/00* (2006.01)

(52) U.S. Cl.
CPC ......... *G02B 6/0065* (2013.01); *G02B 6/0055* (2013.01); *G02B 6/0068* (2013.01); *G02B 6/0083* (2013.01)

(58) Field of Classification Search
CPC .. G02B 6/0065; G02B 6/0055; G02B 6/0068; G02B 6/0083
See application file for complete search history.

(56) References Cited

U.S. PATENT DOCUMENTS

| | | | |
|---|---|---|---|
| 7,997,771 B2 | 8/2011 | Epstein et al. | |
| 8,301,002 B2 | 10/2012 | Shani | |
| 8,576,352 B2 | 11/2013 | Zhu et al. | |
| 2005/0265029 A1 | 12/2005 | Epstein et al. | |
| 2011/0037740 A1 | 2/2011 | Yamaguchi | |
| 2014/0061699 A1 | 3/2014 | Kim | |
| 2019/0294004 A1* | 9/2019 | Hashimoto | ......... H01L 25/0753 |
| 2020/0176650 A1 | 6/2020 | Achi et al. | |
| 2020/0209458 A1 | 7/2020 | Yuu | |
| 2020/0209460 A1 | 7/2020 | Achi et al. | |
| 2020/0284968 A1 | 9/2020 | Yamashita et al. | |

FOREIGN PATENT DOCUMENTS

| | | |
|---|---|---|
| CN | 110364515 A | 10/2019 |
| JP | 3127478 U | 12/2006 |
| JP | 2007335152 A | 12/2007 |
| JP | 2008503034 A | 1/2008 |

(Continued)

*Primary Examiner* — Andrew J Coughlin
*Assistant Examiner* — Jessica M Apenteng
(74) *Attorney, Agent, or Firm* — Hunton Andrews Kurth LLP

(57) ABSTRACT

A method of manufacturing a light emitting module includes: providing an intermediate that includes a light guide having a first principal face and a second principal face opposing the first principal face, a plurality of light sources disposed on the second principal face of the light guide, and a wiring layer disposed on the second principal face and electrically connected to the plurality of light sources; allowing the plurality of light sources to emit light and measuring optical characteristics of the emitted light; and forming an optical characteristic correcting element in the intermediate based on the measured optical characteristics.

30 Claims, 30 Drawing Sheets

(56) References Cited

FOREIGN PATENT DOCUMENTS

| | | | |
|---|---|---|---|
| JP | 2010232525 | A | 10/2010 |
| JP | 2012204337 | A | 10/2012 |
| JP | 2019175846 | A | 10/2019 |
| JP | 2020087889 | A | 6/2020 |
| JP | 2020107584 | A | 7/2020 |
| JP | 2020109745 | A | 7/2020 |
| JP | 2020149962 | A | 9/2020 |
| JP | 2020155406 | A | 9/2020 |
| KR | 101996264 | B1 | 7/2019 |
| WO | 2010070885 | A1 | 6/2010 |

\* cited by examiner

METHOD OF MANUFACTURING LIGHT EMITTING MODULE

CROSS-REFERENCE TO RELATED APPLICATION

This application claims priority to Japanese Patent Application No. 2020-145938 filed on Aug. 31, 2020, and Japanese Patent Application No. 2021-037653 filed on Mar. 9, 2021, the disclosures of which are hereby incorporated by reference in their entireties.

BACKGROUND

The present disclosure relates to a method of manufacturing a light emitting module.

Light emitting modules combining a light guide and a light emitting element such as a light emitting diode are widely utilized as planar light sources such as backlights. The increasing demand for thinner liquid crystal displays is reducing the distance between the liquid crystal panel and the light emitting module in a direct-lit liquid crystal display, for example, in which the backlight is disposed on the rear face of the liquid crystal panel. The proximity allows the optical characteristics, such as the luminance distribution and the chromaticity distribution, of the light emitting module to easily affect the optical characteristics of the liquid crystal display. See, for example, U.S. Pat. No. 7,997,771.

SUMMARY

One of the objects of the present disclosure is to provide a light emitting module manufacturing method which can correct the optical characteristics.

According to an exemplary embodiment of the present disclosure, a method of manufacturing a light emitting module includes: providing an intermediate that includes a light guide having a first principal face and a second principal face opposing the first principal face, a plurality of light sources disposed on the second principal face of the light guide, and a wiring layer disposed on the second principal face and electrically connected to the plurality of light sources; allowing the plurality of light sources to emit light and measuring optical characteristics of the emitted light; and forming an optical characteristic correcting element in the intermediate based on the measured optical characteristics.

According to another exemplary embodiment of the present disclosure, a method of manufacturing a light emitting module includes: providing an intermediate, the intermediate including: a wiring substrate, a light guide having a first principal face and a second principal face opposing the first principal face, wherein the light guide is disposed so as to face the wiring substrate, and in the light guide, a plurality of first holes extend through from the first principal face to the second principal face, and a plurality of light sources disposed on the wiring substrate in the first holes; allowing the plurality of light sources to emit light and measuring the optical characteristics of the emitted light; and replacing, based on the measured optical characteristics, one of the plurality of light sources with other one of the plurality of light sources on the wiring substrate.

According to another exemplary embodiment of the present disclosure, a method of manufacturing a light emitting module includes: providing an intermediate, the intermediate including a wiring substrate and a plurality of light sources disposed on the wiring substrate; allowing the plurality of light sources to emit light and measuring the optical characteristics of the emitted light; replacing, based on the measured optical characteristics, one of the plurality of light sources with other one of the plurality of light sources on the wiring substrate; and subsequent to replacing the light source, disposing on the wiring substrate a light guide that has a first principal face and a second principal face opposing the first principal face and facing the wiring substrate, such that the second principal face faces the wiring substrate.

According to the present disclosure, a light emitting module manufacturing method which can correct the optical characteristics can be provided.

DETAILED DESCRIPTION

Figure 1A:
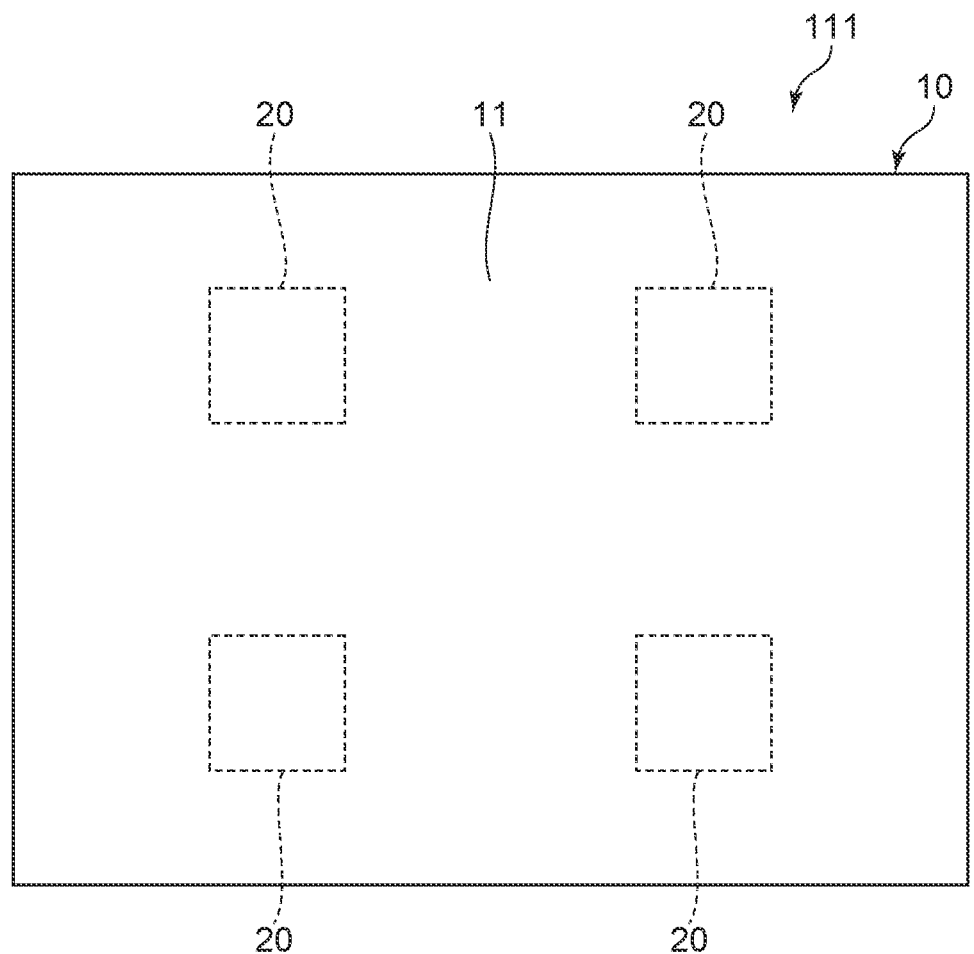
FIG. 1A is a schematic top view of an intermediate according to an exemplary embodiment of the present disclosure.

Certain embodiments of the present disclosure will be explained below with reference to the accompanying drawings. In the drawings, the same reference numerals denote the same constituent elements. In the explanation below, terms showing specific directions and positions (e.g., "upper," "lower," and others including these) will be used as needed. The use of these terms are for making the present disclosure in the drawings being referenced more easily understood, and the meaning of the terms are not intended to limit the technical scope of the present disclosure. The parts shown in multiple drawings denoted by the same reference numerals are equivalent parts or members. The same designation will be used for a member even if its state or shape changes after hardening or cutting.

The embodiments described below are examples of light emitting modules forgiving shape to the technical ideas of the present disclosure, and are not intended to limit the present disclosure. The sizes, materials, shapes, and relative positions of the constituent elements described below are intended for illustration purposes, and are not intended to limit the scope of the present disclosure unless otherwise specifically noted. Furthermore, the elements explained with reference to one embodiment are also applicable to other embodiments. The sizes and positional relationship of the members in the drawings might be exaggerated for clarity of explanation. Furthermore, in a cross-sectional view, an end face showing only the cut face might be presented while omitting what is seen in the background.

A method of manufacturing a light emitting module according to any of the embodiments of the present disclosure includes a process of providing an intermediate.

Figure 1B:
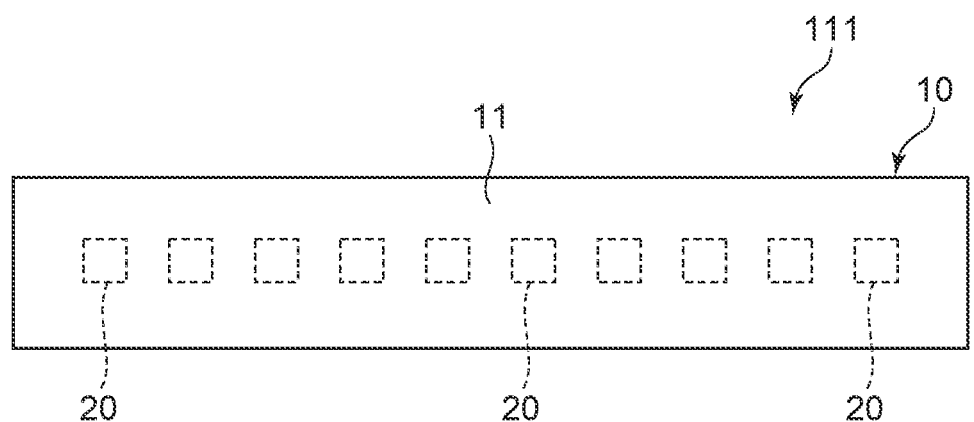
FIG. 1B is a schematic top view of an intermediate according to an exemplary embodiment of the present disclosure.

FIG. 1A and FIG. 1B are schematic top views each showing an intermediate 111 according to one embodiment of the present disclosure.

Figure 2:
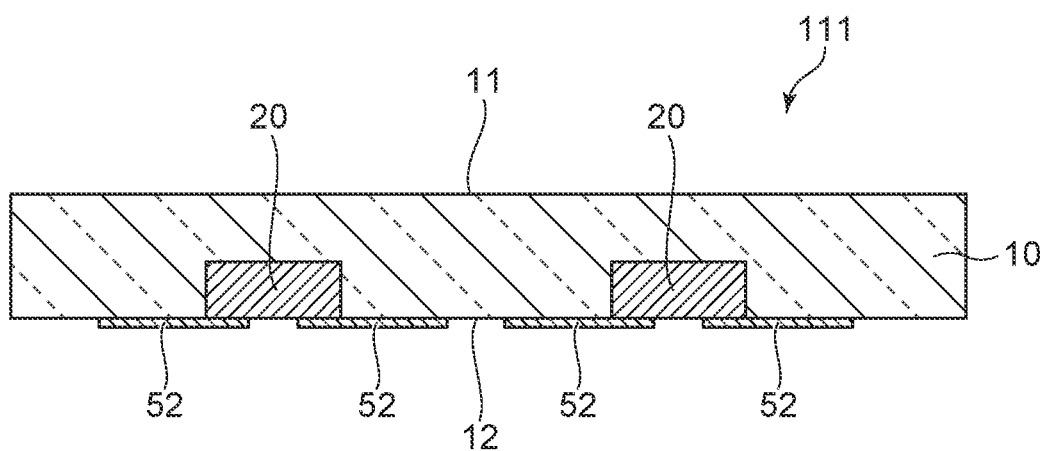
FIG. 2 is a schematic cross-sectional view of an intermediate according to an exemplary embodiment of the present disclosure.

FIG. 2 is a schematic cross-sectional view of an intermediate 111 according to one embodiment of the present disclosure.

An intermediate 111 includes a light guide 10, a plurality of light sources 20, and a wiring layer 52. The light guide 10 includes a first principal face 11 and a second principal face 12 opposing the first principal face 11. The first principal face 11 serves as the emission face of the light emitting module. The light sources 20 are arranged on the second principal face 12 side of the light guide 10. The wiring layer 52 is disposed on the second principal face 12 side of the light guide 10, and is electrically connected to the light sources 20.

As shown in FIG. 1A, the light sources 20 are arranged vertically and laterally in a plane paralleling the first principal face 11 at equal intervals. The light sources 20 can be arranged vertically and laterally at certain intervals. The spacing of the light sources 20 can be suitably selected in accordance with the size of a light emitting module, the intended luminance, and the like. Alternatively, as shown in FIG. 1B, the light sources 20 may be arranged linearly along only one direction.

The light emitted by a light source 20 enters the light guide 10 and is guided through the light guide 10. The light guide 10 has a light transmissivity with respect to the light emitting by a light source 20. Each light source 20 has a light emitting element as described later. The light emitted by a light source 20 represents the light emitted by the light emitting element. In the case in which a light source 20 includes a phosphor, the light emitted by the light source 20 also includes the light emitted by the phosphor. The transmittance of the light guide 10 with respect to the light from a light source 20 is preferably 80% or higher, for example, more preferably 90% or higher.

For the material for the light guide 10, for example, a thermoplastic resin, such as acrylic, polycarbonate, cyclic polyolefin, polyethylene terephthalate, or polyester, a thermosetting resin, such as epoxy or silicone, or glass can be used.

The thickness of the light guide 10 is preferably, for example, 200 µm to 800 µm. The light guide 10 may be made up of a single layer or multiple layers stacked in the thickness direction.

Figure 3A:
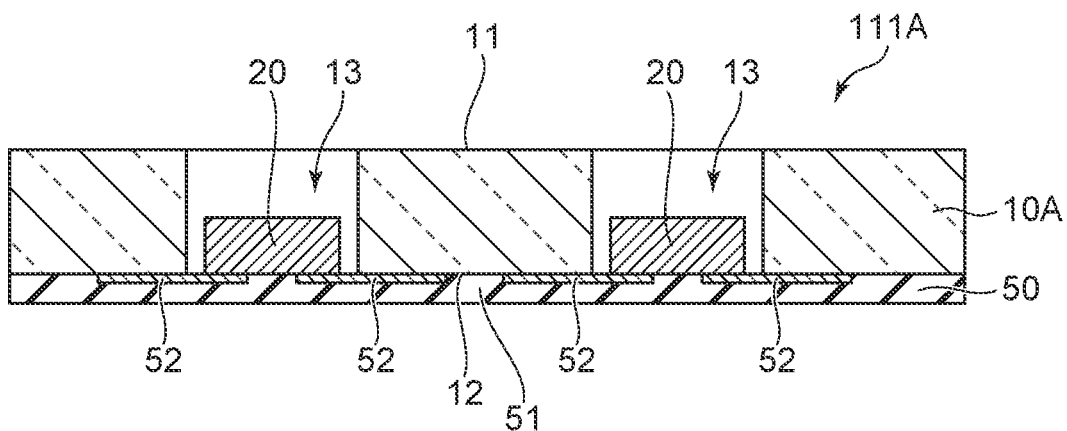
FIG. 3A is a schematic cross-sectional view of an intermediate according to an exemplary embodiment of the present disclosure.
Figure 3B:
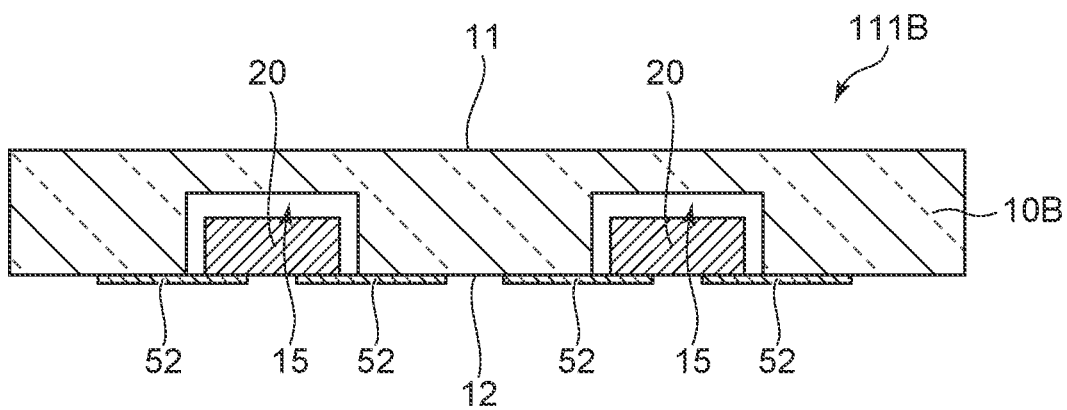
FIG. 3B is a schematic cross-sectional view of an intermediate according to an exemplary embodiment of the present disclosure.
Figure 3C:
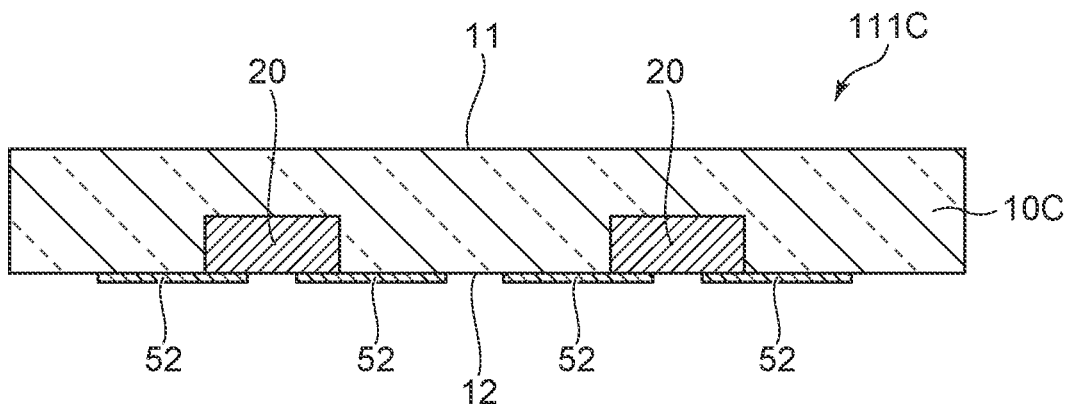
FIG. 3C is a schematic cross-sectional view of an intermediate according to an exemplary embodiment of the present disclosure.

FIG. 3A to FIG. 3C are schematic cross-sectional views of examples of light guides.

In the intermediate 111A shown in FIG. 3A, the wiring layer 52 is provided as a part of the wiring substrate 50 which includes an insulation base 51. The wiring substrate 50 is disposed on the second principal face 12 side of the light guide 10A. The light guide 10A includes a plurality of first holes 13 penetrating from the first principal face 11 to the second principal face 12. The light sources 20 are electrically connected to the wiring substrate 50 in the first holes 13. The light sources 20 are disposed on the second principal face 12 side in the first holes 13. The light sources 20 are disposed such that at least a portion is in the first holes 13 in a cross-sectional view. In the example shown in FIG. 3A, the light sources 20 are entirely disposed in the first holes 13.

The light guide 10B of the intermediate 111B shown in FIG. 3B includes recesses 15 which are open on the second principal face 12 side. The light sources 20 are disposed in the recesses 15 at least in part in a cross section. In the example shown in FIG. 3B, the light sources 20 are entirely disposed in the recesses 15.

In the intermediates shown in FIG. 3A and FIG. 3B, the light sources 20 are combined with the light guides 10A and 10B which have already been formed into a plate or sheet. In contrast, in the intermediate 111C shown in FIG. 3C, the light sources 20 are combined with the light guide 10C by applying the material for forming the light guide 10C in the fluid state to cover the upper faces and the lateral faces of the light sources 20 which is subsequently hardened.

The light guide 10 shown in FIG. 2 inclusively represents the light guides 10A, 10B, and 10C shown in FIGS. 3A to 3C. The intermediate 111 shown in FIG. 2 inclusively represents the intermediates 111A, 111B, and 111C shown in FIGS. 3A to 3C.

In addition to the intermediates illustrated in FIGS. 3A to 3C, a light emitting module provided with an optical characteristic correcting element in the embodiments described later can be used as a new intermediate. For example, after providing the light emitting module provided with sectioning grooves 14 described in a first embodiment as an intermediate and measuring the optical characteristics of the intermediate, an optical characteristic correcting element illustrated in another embodiment can be formed. The structure before measuring the optical characteristics can be broadly defined as an intermediate, and the structure subsequently provided with an optical characteristic correcting element can be defined as a light emitting module. Moreover, optical characteristics can be measured after forming an optical characteristic correcting element, followed by further forming the same or a different element as needed.

A light source will be explained next with reference to FIG. 4A to FIG. 4Q. The light sources 20 shown in FIG. 2 inclusively represent the light sources 20A to 20P shown in FIGS. 4A to 4Q.

Figure 4A:
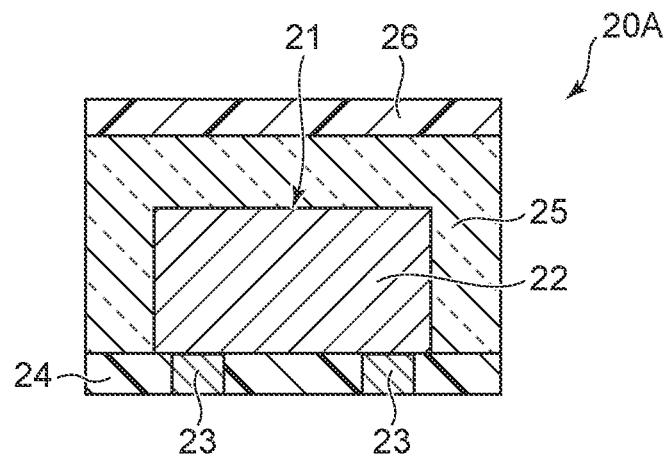
FIG. 4A is a schematic cross-sectional view of a light source according to an exemplary embodiment of the present disclosure.

The light source 20A shown in FIG. 4A includes a light emitting element 21 and a light transmissive member 25. The light source 20A may further include at least either a cover member 24 or a light adjusting member 26.

The light emitting element 21 includes a semiconductor stack structure 22 and a pair of positive and negative electrodes 23. The electrodes 23 are connected to the wiring layer 52 disposed on the second principal face 12 side of a light guide 10. The light emitting element 21 can emit visible light or ultraviolet light. The light emitting element 21 can emit as visible light from blue to red light. The semiconductor stack structure 22 can include, for example, $In_xAl_yGa_{1-x-y}N$ ($0 \leq x$, $0 \leq y$, $x+y \leq 1$).

The semiconductor stack structure 22 can include at least one emission layer capable of emitting light of the colors described above. For example, the semiconductor stack structure 22 can include an emission layer capable of emitting light of one color between an n-type semiconductor layer and a p-type semiconductor layer. The emission layer may have a double heterostructure or single quantum well structure (SQW) having a single active layer, or a multiple quantum well structure (MQW) having a group of active layers. The semiconductor stack structure 22 can have a plurality of emission layers. For example, the semiconductor stack structure 22 may be a structure that includes a plurality of emission layers between an n-type semiconductor layer and a p-type semiconductor layer, or one that repeatedly stacks a structure which successively includes an n-type semiconductor layer, an emission layer, and a p-type semiconductor layer. The plurality of emission layers may include active layers of the same or different emission colors. The same emission color may include a range of colors that may be deemed as the same emission color for the purpose of use, for example, the dominant wavelengths may have variations of about several nanometers. An emission color combination may be suitably selected. Examples of emission color combinations in the case in which the semiconductor stack structure 22 includes two emission layers include blue light and blue light, green light and green light, red light and red light, ultraviolet light and ultraviolet light, blue light and green light, blue light and red light, green light and red light, and the like.

The light transmissive member 25 can cover at least one of the upper face, the lower face, and the lateral faces of the light emitting element 21. The light source 20A shown in FIG. 4A is an example in which the light transmissive member 25 covers the upper face and the lateral faces of the light emitting element 21. For the material for the light transmissive member 25, for example, a light transmissive resin, such as silicone, epoxy, or the like, or glass can be used. The light transmissive member 25 may have as a base material any of these light transmissive materials, and contain a phosphor in the base material. The phosphor is a wavelength conversion substance excited by the light emitted by a light emitting element 21 and emits light of a different wavelength from the wavelength of the light emitted by the light emitting element 21.

The light source 20A can include a cover member 24 disposed on the lower face side of the light emitting element 21. The cover member 24 has a light reflectivity with respect to the light emitted by the light source 20A. For example, the reflectance of the cover member 24 can be set as 70% or higher with respect to the light from the light emitting element 21. The cover member 24, for example, is a white resin member containing a light diffusing agent. Examples of light diffusing agents include microparticles of $TiO_2$, $SiO_2$, $Al_2O_3$, $ZrO_2$, $ZnO$, and the like.

The cover member 24 is disposed to expose at least a portion of the surface of each electrode 23 (the lower face in FIG. 4A). The cover member 24 is disposed in contact with the lower face of the semiconductor stack structure 22 of the light emitting element 21, or via a light transmissive member. The cover member 24 can be also disposed on the lower face of the light transmissive member 25 which covers the lateral faces of the light emitting element 21.

In the example shown in FIG. 4A, the cover member 24 covers in contact with the lower face of the semiconductor stack structure 22. The cover member 24 also covers in contact with the lateral faces of the electrodes 23. Furthermore, the cover member 24 covers in contact with the lower face of the light transmissive member 25.

The light source 20A can include a light adjusting member 26 disposed on the upper face side of the light emitting element 21. The light adjusting member 26 reflects a portion and transmits the other portion of the light emitted by the light emitting element 21 and the phosphor. For example, the reflectance of the light adjusting member 26 can be set as 90% or higher with respect to the light from the light emitting element 21. The light adjusting member 26 can have a light transmissive resin and a light diffusing agent dispersed in the light transmissive resin. Examples of light transmissive resins include silicone and epoxy. Examples of light diffusing agents include microparticles of $TiO_2$, $SiO_2$, $Al_2O_3$, $ZrO_2$, $ZnO$, and the like. The light adjusting member 26 may be a light reflecting metal member, such as Al, Ag, and the like, or a DBR (distributed Bragg reflector). Furthermore, the light adjusting member 26 may be a combination of these.

Figure 4B:
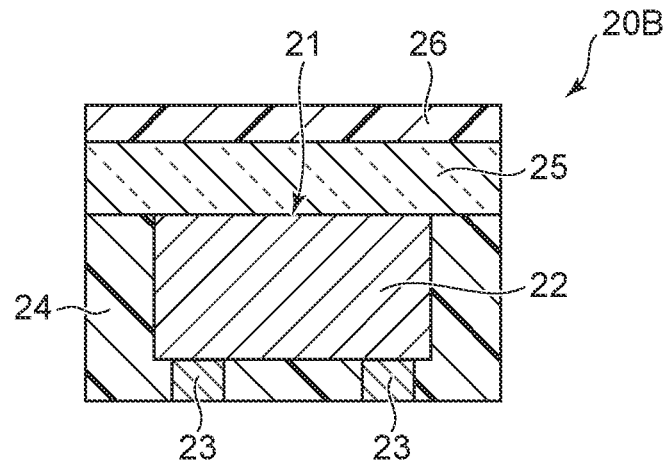
FIG. 4B is a schematic cross-sectional view of a light source according to an exemplary embodiment of the present disclosure.

In the light source 20B shown in FIG. 4B, a cover member 24 covers the lateral faces and the lower face of the semiconductor stack structure 22 of the light emitting element 21. A light transmissive member 25 is disposed on the upper face of the semiconductor stack structure 22. The light transmissive member 25 is also disposed on the cover member 24 that covers the lateral faces of the semiconductor stack structure 22. A light adjusting member 26 is disposed on the light transmissive member 25.

Figure 4C:
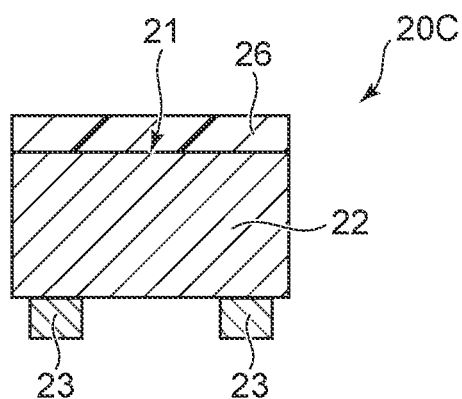
FIG. 4C is a schematic cross-sectional view of a light source according to an exemplary embodiment of the present disclosure.

The light source shown in FIG. 4C does not include the light transmissive member 25 or the cover member 24 described earlier, but includes a light adjusting member 26 disposed on the upper face of the light emitting element 21.

Figure 4D:
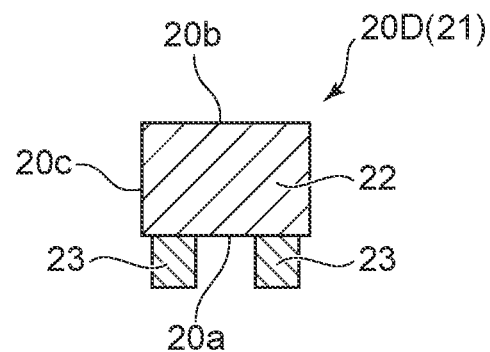
FIG. 4D is a schematic cross-sectional view of a light source according to an exemplary embodiment of the present disclosure.
Figure 4E:
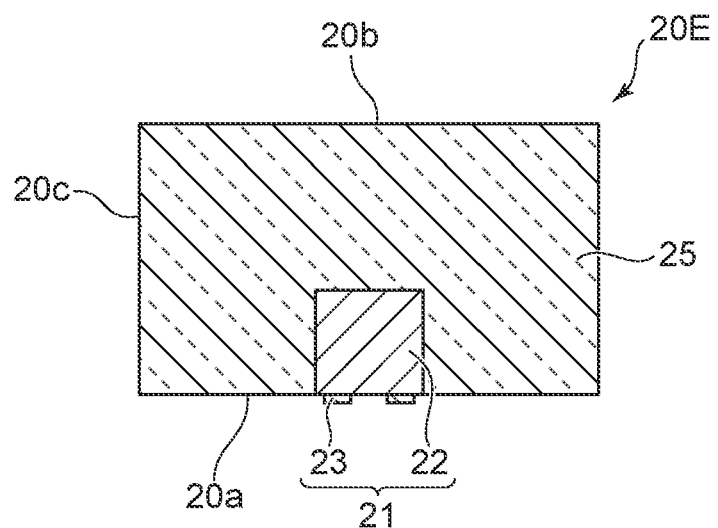
FIG. 4E is a schematic cross-sectional view of a light source according to an exemplary embodiment of the present disclosure.
Figure 4F:
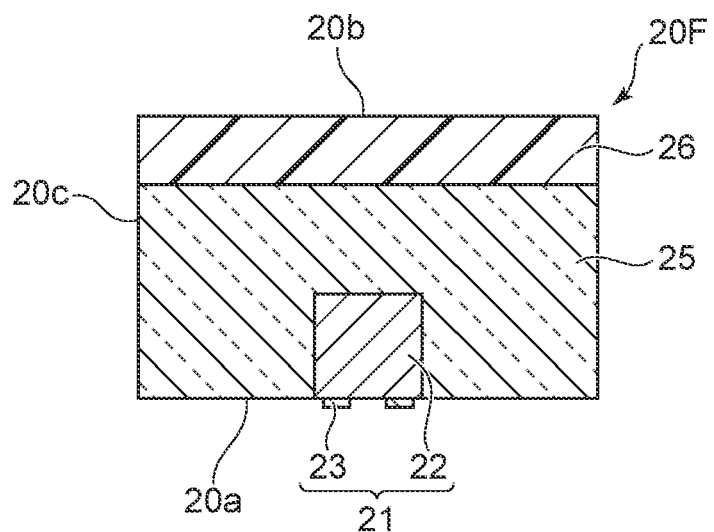
FIG. 4F is a schematic cross-sectional view of a light source according to an exemplary embodiment of the present disclosure.
Figure 4G:
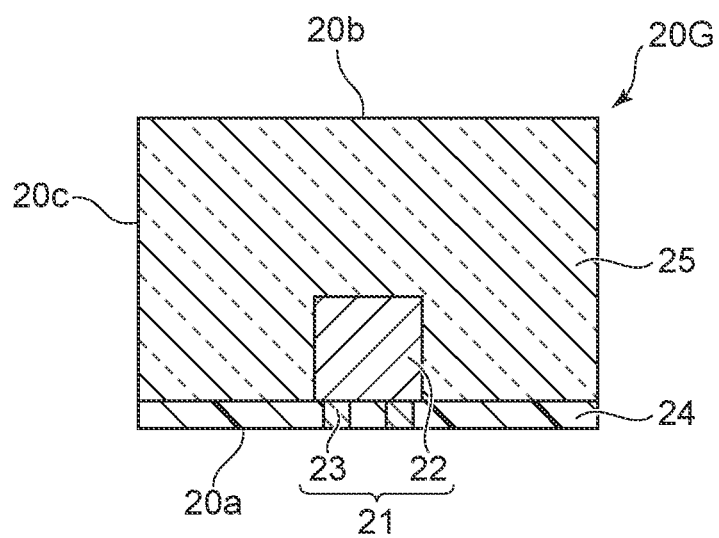
FIG. 4G is a schematic cross-sectional view of a light source according to an exemplary embodiment of the present disclosure.
Figure 4H:
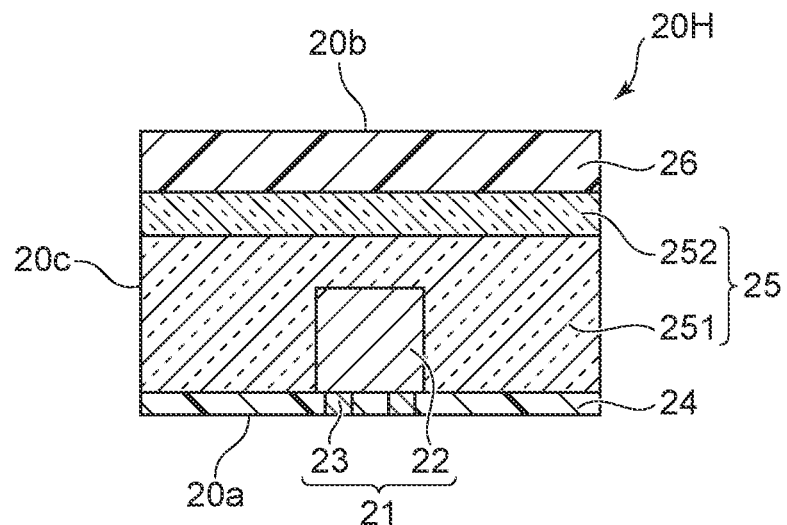
FIG. 4H is a schematic cross-sectional view of a light source according to an exemplary embodiment of the present disclosure.
Figure 4I:
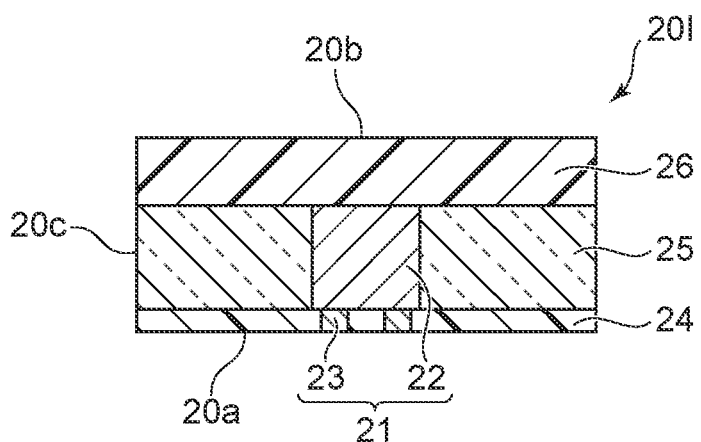
FIG. 4I is a schematic cross-sectional view of a light source according to an exemplary embodiment of the present disclosure.
Figure 4J:
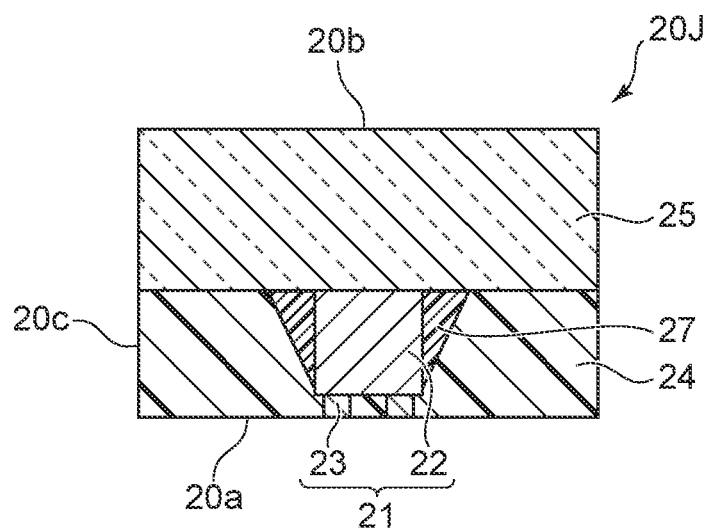
FIG. 4J is a schematic cross-sectional view of a light source according to an exemplary embodiment of the present disclosure.
Figure 4K:
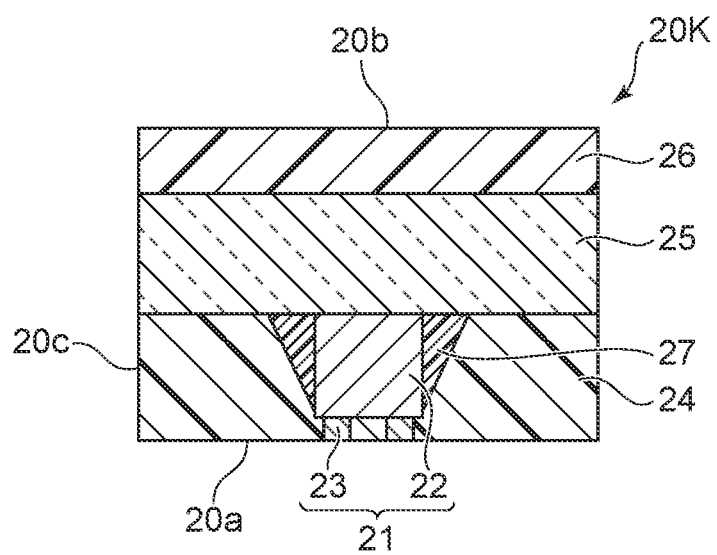
FIG. 4K is a schematic cross-sectional view of a light source according to an exemplary embodiment of the present disclosure.
Figure 4L:
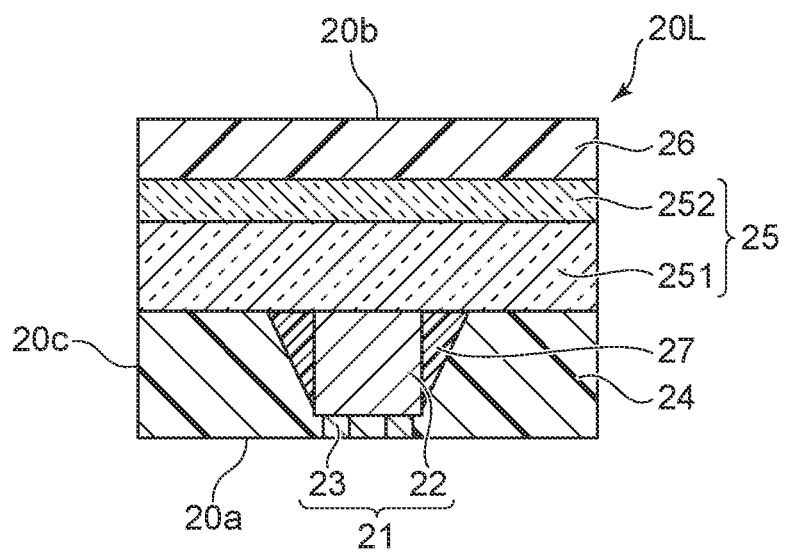
FIG. 4L is a schematic cross-sectional view of a light source according to an exemplary embodiment of the present disclosure.
Figure 4M:
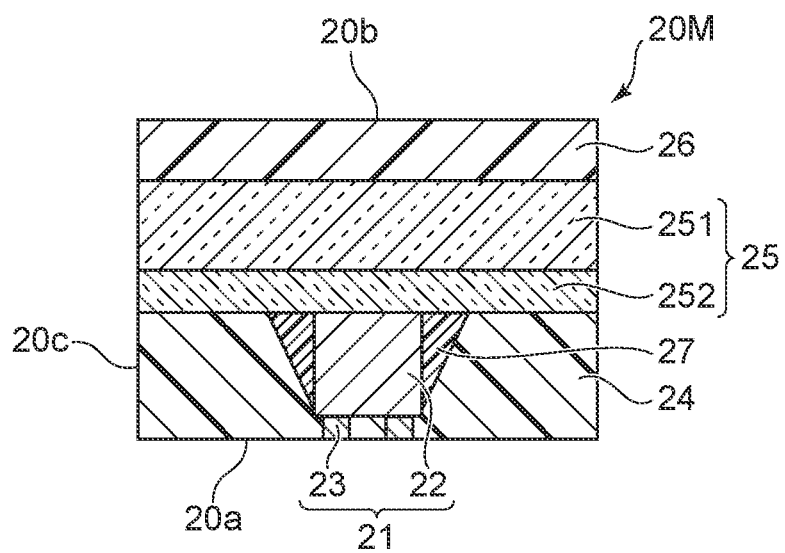
FIG. 4M is a schematic cross-sectional view of a light source according to an exemplary embodiment of the present disclosure.
Figure 4N:
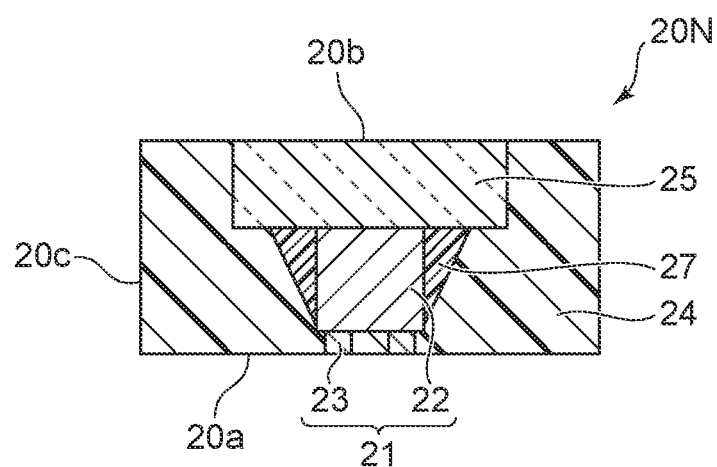
FIG. 4N is a schematic cross-sectional view of a light source according to an exemplary embodiment of the present disclosure.
Figure 4O:
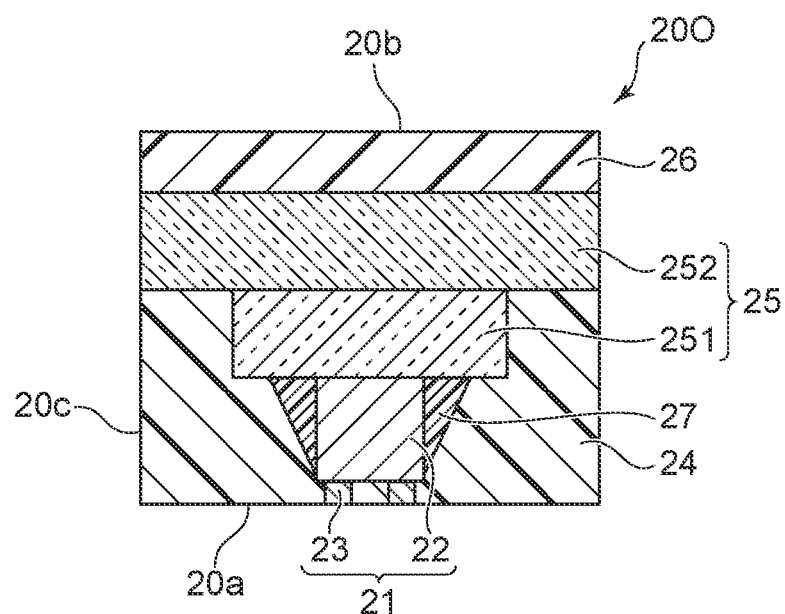
FIG. 4O is a schematic cross-sectional view of a light source according to an exemplary embodiment of the present disclosure.

The light source 20D shown in FIG. 4D is composed only of a light emitting element 21. The first face (lower face) 20a of the light source 20D is the lower face of the light emitting element 21. The second face (upper face) 20b of the light source 20D is the upper face of the light emitting element 21. The lateral faces 20c of the light source 20D are the lateral faces of the light emitting element 21.

In each of the light sources 20E to 20I shown in FIGS. 4E to 4I, the lateral faces of the semiconductor stack structure 22 of the light emitting element 21 are covered by a light transmissive member 25. Around the lateral faces of the light emitting element 21, the light transmissive member 25 makes up the lateral faces 20c of the light sources 20E to 20I in whole or part. Structuring the light sources 20E to 20I in this manner allows the light laterally emitted from the light emitting element 21 to readily exit the light sources 20E to 20I laterally.

In the light sources 20E to 20H, moreover, the upper face of the light emitting element 21 is also covered by the light transmissive member 25. Moreover, the light transmissive member 25 of the light sources 20H and 20L has a double-layer structure configured as a first light transmissive member 251 and a second light transmissive member 252 formed on the first light transmissive member. The light transmissive member 25 of the light source 20M has a double-layer structure configured as a second light transmissive member 252 and a first light transmissive member 251 stacked on the second light transmissive member. For example, they can be formed such that the first light transmissive member 251 contains a wavelength conversion substance and the second light transmissive member 252 contains substantially no wavelength conversion substance. The first light transmissive member 251 and the second light transmissive member 252 may contain the same or different wavelength conversion substances. The light transmissive member 25 may have a structure having three or more layers. Furthermore, the light transmissive member 25 covering the lateral faces of the semiconductor stack structure 22 and the light transmissive member 25 covering the upper face of the semiconductor stack structure 22 may be integrated or individual parts. In the case of forming them as individual parts, the light transmissive members 25 may be made of the same materials, or they contain wavelength conversion substances of different types and/or different concentrations.

In the light sources 20E and 20F, the lower face of the semiconductor stack structure 22 of the light emitting element 21 and the electrodes 23 are exposed from the light transmissive member 25. In such a case, the electrodes 23 of the light emitting element 21 preferably have a small thickness. The thickness of each electrode 23 can be set to 0.5 μm to 100 μm. Such a structure can reduce the thickness of the light source. This in turn can reduce the thickness of a light emitting module.

In the light sources 20J to 20P shown in FIG. 4J to FIG. 4Q, a light reflecting cover member 24 is disposed on the lateral faces of the light emitting element 21. The cover member 24 directly or indirectly covers the lateral faces of the semiconductor stack structure 22 of the light emitting element 21. In each of the light sources 20J to 20O, the cover member 24 covers the lateral faces of the semiconductor stack structure 22 of the light emitting element 21 via the light transmissive adhesive member 27 which covers the lateral faces of the semiconductor stack structure 22 of the light emitting element 21. Not limited to this, the cover member 24 may be in contact with the lateral faces of the semiconductor stack structure 22 of the light emitting element 21 as in the case of the light source 20P.

In the light source 20N, the cover member 24 covers the lateral faces of the light transmissive member 25. Such a structure can make it easier to control light using the light adjusting member in the case where the light adjusting member is positioned on the upper face of the light transmissive member 25. In the light source 20O, the cover member 24 covers the lateral faces of the first light transmissive member 251 which is the lower layer of the light transmissive member 25, but does not cover the lateral faces of the second light transmissive member 252 which is the upper layer, of the light transmissive member 25. Such a structure allows the light adjusting member 26 disposed on the second light transmissive member 252 to easily control light.

In the light sources 20J to 20O, the light transmissive member 25 and the light emitting element 21 are adhered by the light transmissive adhesive member 27. The light transmissive adhesive member 27 covers the lateral faces of the semiconductor stack structure 22 of the light emitting element 21. The light transmissive adhesive member 27 may be present between the light emitting element 21 and the light transmissive member 25. The light transmissive adhesive member 27 may be omitted as in the case of the light source 20P. For the light transmissive adhesive member 27, an epoxy resin, silicone resin, or resin mixing these can be used.

Figure 4P:
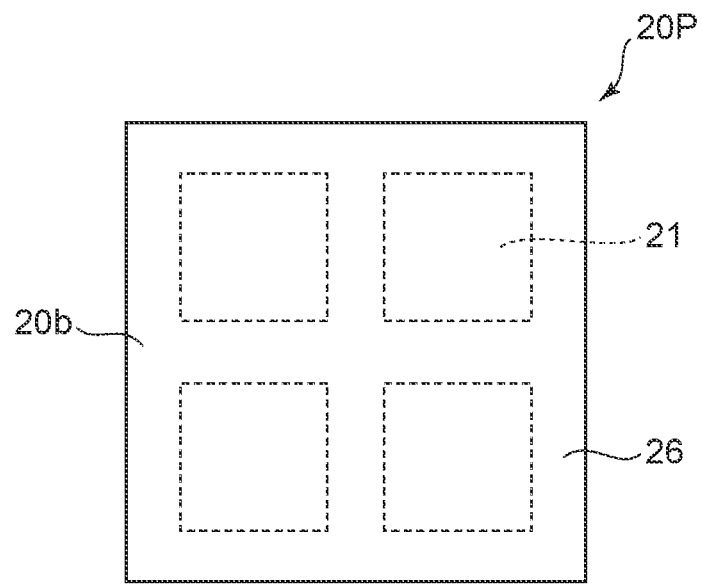
FIG. 4P is a schematic top view of a light source according to an exemplary embodiment of the present disclosure.
Figure 4Q:
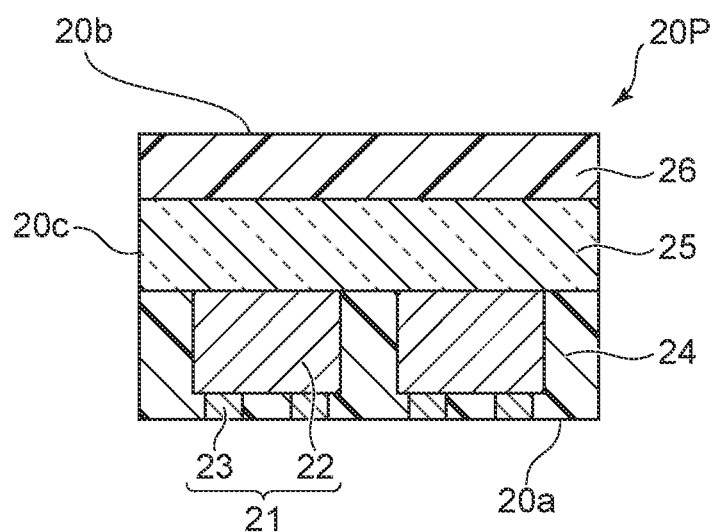
FIG. 4Q is a schematic cross-sectional view of a light source according to an exemplary embodiment of the present disclosure.

The light source 20P shown in FIG. 4P and FIG. 4Q includes a plurality of light emitting elements 21. Here, an example having four light emitting elements 21 arranged in two rows and two columns is shown. The number of light emitting elements 21 is not limited to this. The emission wavelengths of the light from the light emitting elements 21 may be the same or different. For example, a red light emitting element and a green light emitting element can be arranged from the left to the right on the upper row, and a blue light emitting element and a red light emitting element can be arranged from the left to the right on the lower row in FIG. 4P. Employing light emitting elements of three primary colors of light as described above can eliminate the need to include a wavelength conversion substance in the light transmissive member 25 disposed thereon.

The light sources 20G to 20P include a light reflecting cover member 24 that covers the lower face of the semiconductor stack structure 22 and the lateral faces of the electrodes 23 of the light emitting element 21. In other words, the first face 20a of the light source is configured as the cover member 24 and the electrodes 23 of the light emitting element 21. This can hinder the wiring substrate or the like from absorbing the light from the light emitting element 21.

The light sources 20F, 20H, 20I, 20K, 20L, 20M, 20O, and 20P include a light adjusting member 26 above the light emitting element(s) 21. In the light source 20I, the upper face of the light emitting element 21 is in contact with the light adjusting member 26. The second face 20b of each of these light sources is configured as the light adjusting member 26. The light adjusting member 26 includes a light reflecting member. Including the light adjusting member 26 can adjust the amount of light output upwards from the light source. This can reduce luminance nonuniformity when viewing the first principal face 11 of the light guide 10 which will be the light extraction face of a light emitting module, thereby producing a light emitting module and a planar light source exhibiting good luminance uniformity.

A light source in which the lower face of the semiconductor stack structure 22 and the lateral faces of the electrodes 23 of the light emitting element 21 are covered by a cover member 24 or a light transmissive member 25 may include a metal film covering the electrodes 23 which can be formed by plating or sputtering. For the metal film, for example, Ag, Ni, Au, Ru, Ti, Pt, or the like can be used in a single layer or a stack of layers. For a stacked structure, for example, one made by successively stacking Ag/Cu, Ni/Au, Ni/Ru/Au, Ti/Pt/Au, or Cu/Ni/Au can be used. The metal film may be disposed to continuously cover the pair of electrodes 23 and a portion of the cover member 25 or the light transmissive member 25 that covers the lateral faces of the electrodes 23.

Figure 5A:
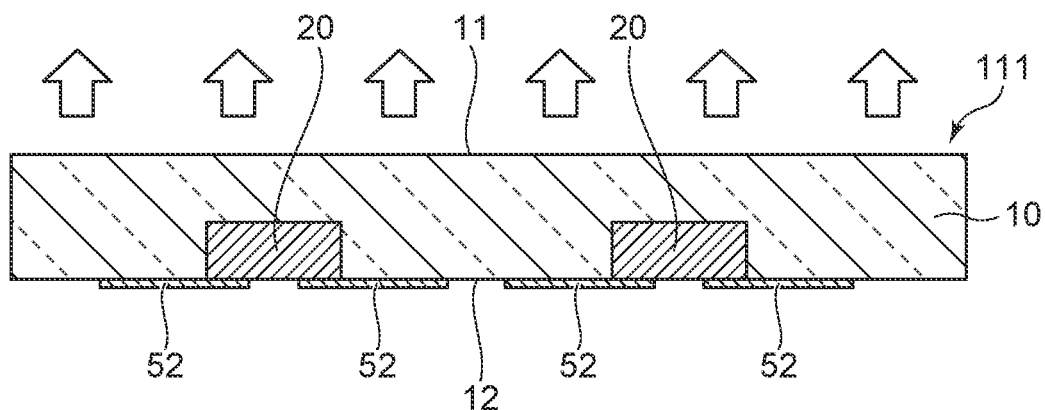
FIG. 5A is a schematic cross-sectional view showing a light emitting module manufacturing process according to an exemplary embodiment of the present disclosure.

A method of manufacturing a light emitting module according to one embodiment of the present disclosure further includes, after providing an intermediate 111, allowing the light sources 20 in the intermediate 111 to emit light and measuring the optical characteristics of the emitted light as shown in FIG. 5A.

Power is supplied to each of the light sources 20 through the wiring layer 52, and each light source 20 emits light. All light sources 20 may be lit, or some of those selected among the light sources 20 may be lit.

The light emitted by the light sources 20 is guided through the light guide 10 before exiting the first principal face 11. In each embodiment, the optical characteristics of the light exiting the first principal face 11 are measured from directly above, perpendicularly or obliquely to the first principal face 11.

In the case in which the light sources 20 contain a phosphor having a relatively long excitation-to-emission response time (e.g., a KSF phosphor or the like), measuring the optical characteristics past a period of time after lighting the light source 20 can achieve stable optical characteristics measurements.

Optical characteristics, for example, refer to the luminance distribution or the chromaticity distribution, or both the luminance distribution and the chromaticity distribution, in the first principal face (emission face) 11 of the light guide 10.

Figure 5B:
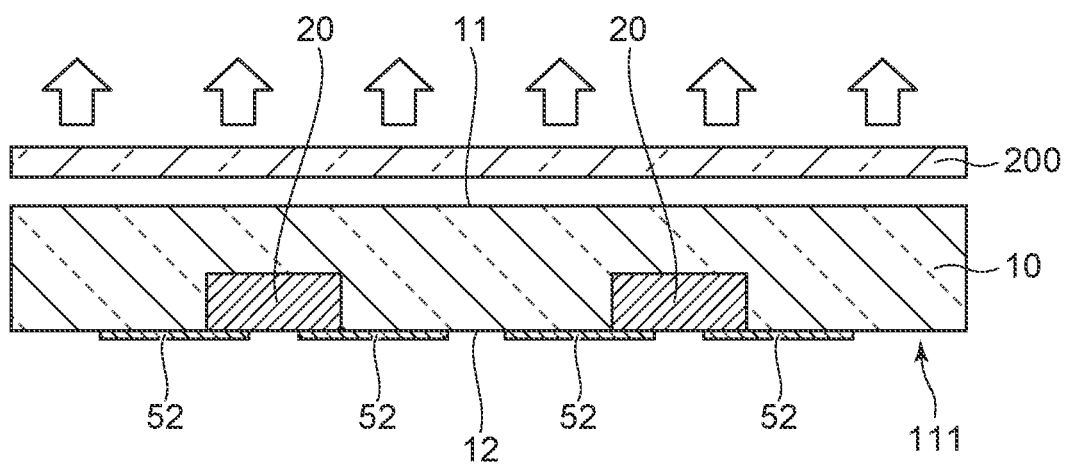
FIG. 5B is a schematic cross-sectional view showing a light emitting module manufacturing process according to an exemplary embodiment of the present disclosure.

Moreover, as shown in FIG. 5B, the light exiting the first principal face 11 may be measured through, for example, an optical member 200, such as a color filter, diffusion sheet, or prism sheet.

A method of manufacturing a light emitting module according to one embodiment of the present disclosure further includes, after measuring the optical characteristics of the intermediate 111, forming an optical characteristic correcting element in the intermediate 111 based on the measured optical characteristics. In each embodiment, the correction of the optical characteristics includes, for example, a reduction of the luminance distribution and/or chromaticity distribution nonuniformity in the first principal face (emission face) 11. The correction of optical characteristics includes changing the luminance and/or chromaticity of a specific region in the first principal face (emission face) 11.

First Embodiment

Figure 6A:
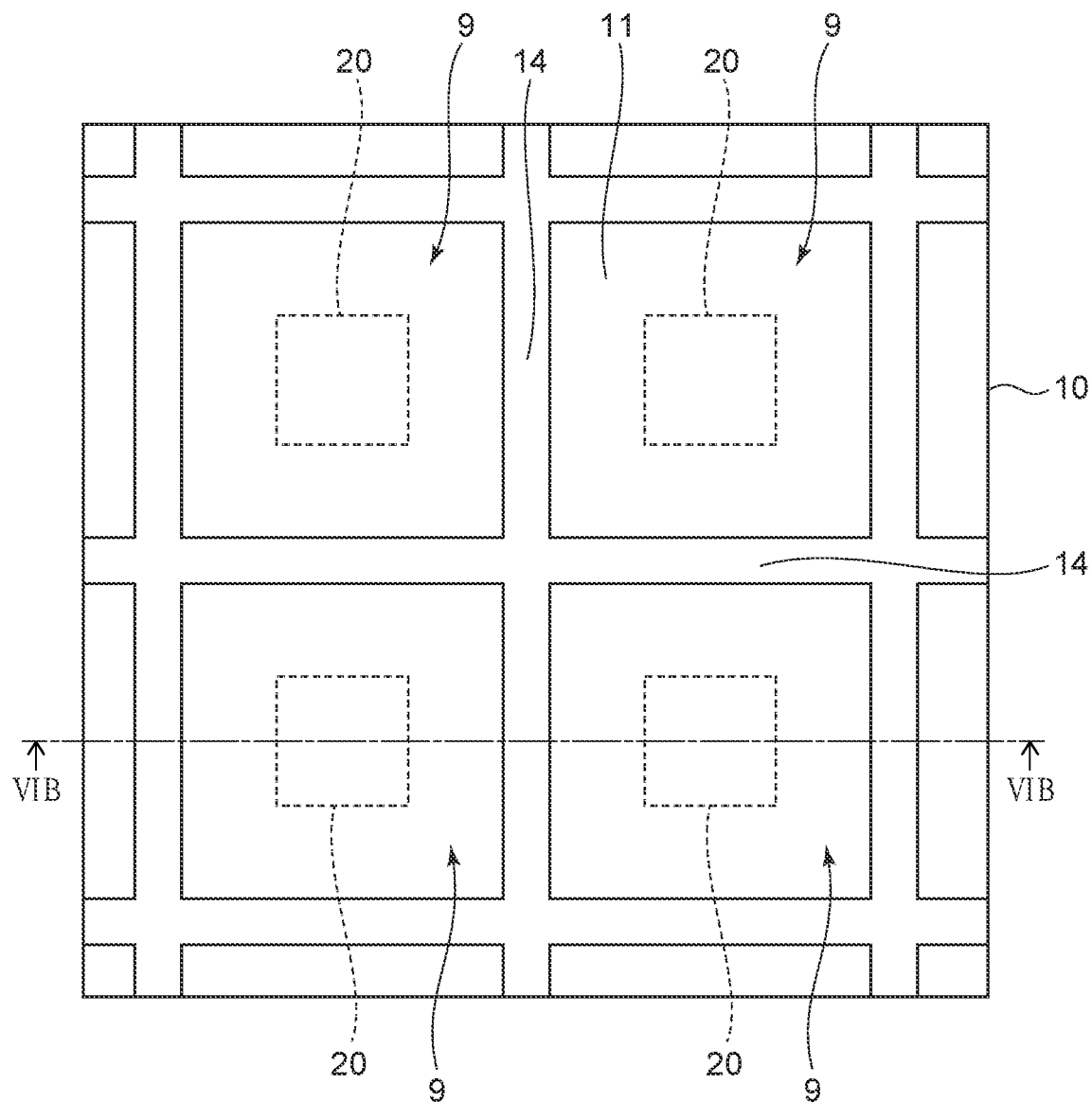
FIG. 6A is a schematic top view showing a light emitting module manufacturing process according to a first embodiment of the present disclosure.

FIG. 6A is a schematic top view of a light emitting module manufacturing process according to a first embodiment. FIG. 6A is a top view of the first principal face 11 of the light guide 10.

Figure 6B:
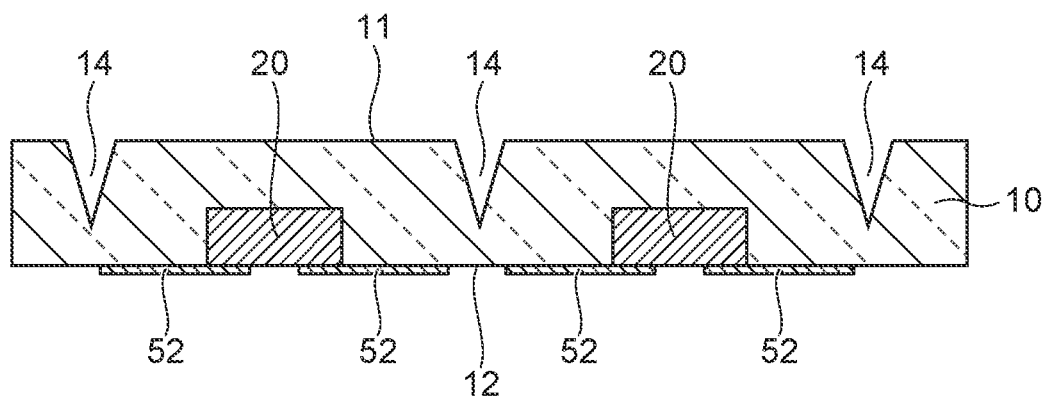
FIG. 6B is a schematic cross-sectional view taken along line VIB-VIB in FIG. 6A.

FIG. 6B is a schematic cross-sectional view taken along line VIB-VIB in FIG. 6A.

The process of forming an optical characteristic correcting element according to the first embodiment includes forming sectioning grooves 14 on the light guide 10 to compartmentalize regions each including at least one light source 20.

Examples of methods of forming sectioning groves 14 include partially removing the light guide by using a rotary blade, ultrasonic cutter, heated cutter, or the like. Other examples include laser beam irradiation, blasting, and the like.

The sectioning grooves 14 are partitions provided to increase the contrast between a lit region and an unlit region during local dimming in which some of the light sources 20 in the light emitting module are lit. For example, as shown in FIG. 6A, when each square region surrounded by the sectioning grooves 14 is an emission region 9, each emission region 9 can be a driving unit for local dimming. The sectioning grooves 14 are preferably formed in a lattice pattern such that each emission region 9 is a square in a top view. Not limited to this, the sectioning grooves may be formed in a triangular lattice pattern such that each emission region is a triangle in a top view, or a hexagonal lattice pattern such that each emission region is a hexagon in a top view.

Each emission region 9 is preferably free from uneven luminance and chromaticity. Particularly, the difference in the luminance and the chromaticity between adjacent emission regions 9 is preferably small. Accordingly, lighting the light sources 20 in the intermediate 111 provided with a light guide 10 that is not yet provided with sectioning groove 14, followed by forming the sectioning groove 14 upon adjusting its positions and the widths in accordance with the measured emission characteristics of the light sources 20 can reduce the luminance nonuniformity and the chromaticity nonuniformity among emission regions 9 which in turn can reduce the luminance nonuniformity and the chromaticity nonuniformity across the planar emission surface of a light emitting module.

For example, in the light emitting module shown in FIG. 6A, the sectioning grooves 14 are arranged to surround individual light sources 20. Not limited to this, the sectioning grooves 14 may be formed to position two or more light sources 20 per emission region 9.

The optical characteristics can be corrected by adjusting, for example, the distances between the sectioning grooves 14 and the light sources 20, the widths and the depths of the sectioning grooves 14, or the like, based on the measured optical characteristics of the intermediate 111. This allows each emission region 9 to have desired optical characteristics. For example, among the light sources 20, a relatively high luminous light source 20 can be more distanced from the sectioning grooves 14 than a relatively less luminous light source 20.

FIG. 6B illustrates bottomed sectioning groves 14 open on the first principal face 11 and not reaching the second principal face 12. The bottomed sectioning groves 14 may be open on the second principal face 12 and not reaching the first principal face 11. Alternatively, the sectioning grooves 14 may extend through from the first principal face 11 to the second principal face 12. After creating such sectioning grooves 14 and measuring the optical characteristics, based on the measurements, a member having a lower refractive index than that of the light guide 10 can be disposed or the air can be retained in the sectioning grooves 14 at certain locations to correct the optical characteristics. Based on the measurements, a light reflecting member can be disposed in the sectioning grooves 14, in which case, the optical characteristics can be corrected by adjusting the positions or the transmittance of the light reflecting member. In the case in which the light reflecting member is a resin containing a filler, the transmittance can be adjusted by changing the concentration of the filler.

As described above, by forming the sectioning grooves 14 based on the measured optical characteristics of the intermediate 111 not yet provided with any sectioning groove 14, the luminance distribution nonuniformity or the chromaticity distribution nonuniformity of a light emitting module can be reduced. In the case in which a light emitting module has a large surface area, in particular, the light emitting module can easily be affected by the thermal contraction of the light guide 10 caused by the heat generated during manufacturing. For this reason, if a light guide 10 already provided with sectioning grooves 14 is used, for example, the areas of the emission regions 9 in the finished light emitting module could vary. In other words, even if the light sources 20 which have been sorted based on the measured emission characteristics were used, the light guide 10 which undergoes thermal contraction during manufacturing might cause the optical characteristics of the emission regions 9 to deviate from the desired optical characteristics which can consequently produce a light emitting module having luminance nonuniformity or chromaticity nonuniformity. Accordingly, forming sectioning grooves 14 after measuring the optical characteristics as described above can make a light emitting module less prone to the effect associated with the thermal history during manufacturing to thereby achieve a desirable luminance distribution or chromaticity distribution.

Second Embodiment

Figure 7A:
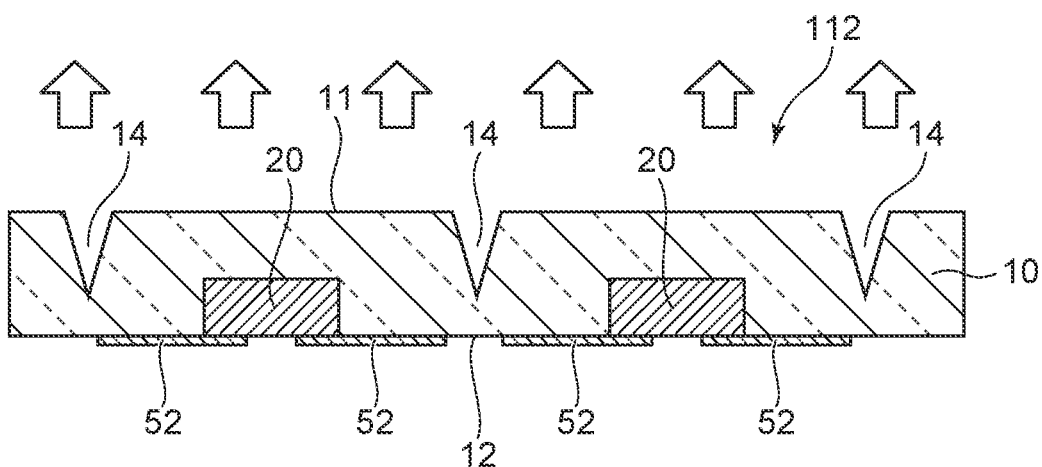
FIG. 7A is a schematic cross-sectional view showing a light emitting module manufacturing process according to a second embodiment of the present disclosure.

FIG. 7A is a schematic cross-sectional view showing a light emitting module manufacturing process according to a second embodiment.

In the second embodiment, an example which employs, as an intermediate 112, the light emitting module obtained by the first embodiment will be explained. In other words, the light guide 10 of the intermediate 112 includes, in addition to the constituent elements of the intermediate 111 shown in FIG. 5A, the sectioning grooves 14 explained with reference to the first embodiment. For the intermediate, one having the constituent elements formed in another embodiment can be used. For example, the intermediate in the second embodiment is not limited to one provided with sectional grooves 14, and an intermediate without sectioning grooves 14 can be used.

A light emitting module manufacturing process according to the second embodiment includes providing an intermediate 112 having sectional grooves 14 and, as shown in FIG. 7A, allowing the light sources 20 in the intermediate 112 to emit light and measuring the optical characteristics of the light exiting the first principal face 11.

The light emitting module manufacturing process of the second embodiment further includes, subsequent to measuring the optical characteristics, forming light adjusting holes 17 as optical characteristic correcting elements in the intermediate 112 based on the measurements.

Figure 7B:
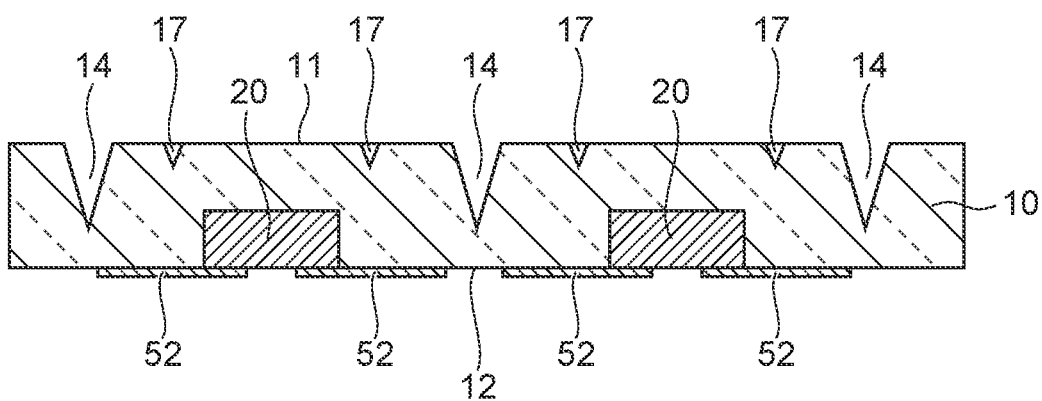
FIG. 7B is a schematic cross-sectional view showing a light emitting module manufacturing process according to the second embodiment of the present disclosure.

FIG. 7B is a schematic cross-sectional view showing the process of forming the optical characteristic correcting elements in the second embodiment.

Figure 8A:
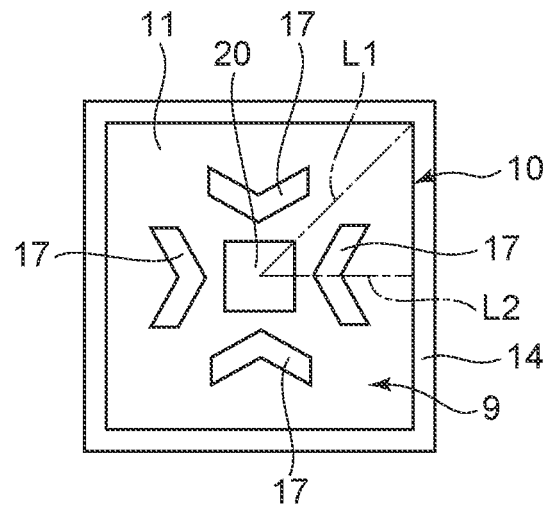
FIG. 8A is a schematic top view showing a light emitting module manufacturing process according to the second embodiment of the present disclosure.
Figure 8B:
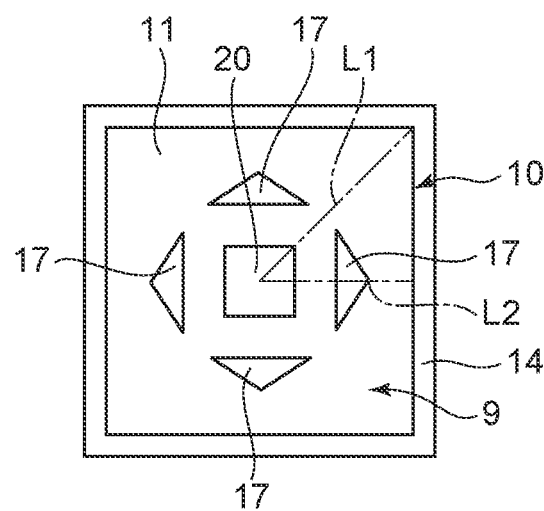
FIG. 8B is a schematic top view showing a light emitting module manufacturing process according to the second embodiment of the present disclosure.
Figure 8C:
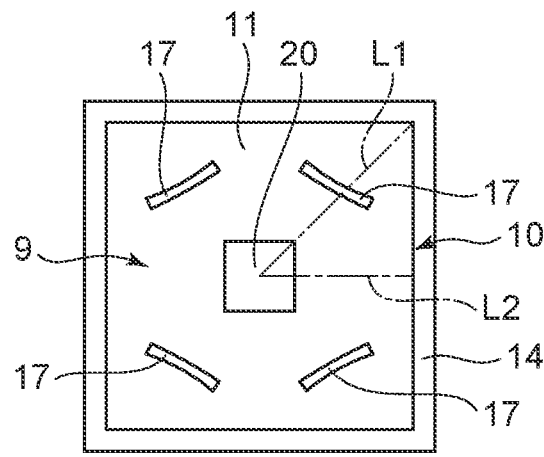
FIG. 8C is a schematic top view showing a light emitting module manufacturing process according to the second embodiment of the present disclosure.

FIG. 8A to FIG. 8C are schematic top views showing the process of forming the optical characteristic correcting elements in the second embodiment.

In the second embodiment, the process of forming the optical characteristic correcting elements, as shown in FIG. 8A to FIG. 8C, includes forming light adjusting holes 17 in the light guide 10 between the sectioning grooves 14 and the light sources 20.

Examples of methods of forming light adjusting holes 17 include partially removing the light guide 10 by using a rotary blade, ultrasonic cutter, heated cutter, or the like. Other examples include laser beam irradiation, blasting and the like. In addition, the light guide 10 can be partially deformed by using a hot press.

The light adjusting holes 17 are grooves that can reduce the luminance distribution nonuniformity in the vicinity of each light source. For example, in the case of an intermediate having sectioning grooves 14 in which each emission region 9 surrounded by the sectioning grooves 14 is a square in a top view, the light adjusting holes 17 can be provided as grooves for reducing the luminance distribution nonuniformity in each emission region 9.

The light adjusting holes 17 have lateral faces for changing the direction of travel of the light from a light source 20 by primarily reflecting the light in one case, and primarily refracting the light in another case. Allowing the light adjusting holes 17 to reflect or refract the light towards the areas which tend to have low luminance can reduce the luminance distribution nonuniformity.

For example, in the case in which an emission region 9 surrounded by sectioning grooves 14 is a square in a top view and a light source 20 is positioned in vicinity of the center of the emission region 9, the distance from the light source 20 to each corner of the emission region 9 is larger than the distance from the light source 20 to the center of each side of the emission region 9. For this reason, the areas near the corners of the emission region 9 tend to be less luminous than the other area. The light adjusting holes 17 can make the adjustment to allow the light from the light source 20 to readily propagate towards the less luminous corners.

In the examples shown in FIG. 8A to FIG. 8C, the emission region 9 is approximately square shaped in a top view, and the light source 20 is positioned in the center. Four light adjusting holes 17 are arranged to correspond to the four sides or the four corners of the emission region 9. In each example shown in the drawing, the light adjusting holes 17 have the same shape. However, depending on the position and the optical characteristics of the light source 20, the number of light adjusting holes 17 can be adjusted to from 1 to 3.

Such light adjusting holes 17 are also effective in an intermediate not provided with sectional grooves 14. For example, the case will be assumed in which the intermediate has the light sources 20 arranged vertically and laterally as shown in FIG. 6A, but not provided with sectioning grooves 14. The space between adjacent light sources 20 in a vertical or lateral direction is smaller than that in a diagonal direction. In other words, because of the large spacing of the light sources 20 in the diagonal directions, the portions of the emission regions corresponding to the corners should the sectioning grooves 14 be present are more distant from the light sources 20 to which the light from the light sources 20 does not readily propagate, and thus have low luminance. Accordingly, even in the case in which the light guide has no sectioning groove 14, forming the light adjusting holes 17 that facilitate the diagonal propagation of the light from the light sources 20 allows the light to readily propagate towards the areas which tend to have low luminance. This can reduce the luminance distribution nonuniformity of a light emitting module.

As shown in FIG. 7B, the light adjusting holes 17, for example, are bottomed holes that are open on the first principal face 11. The light adjusting holes 17 may be bottomed holes that are open on the second principal face 12. Alternatively, the light adjusting holes 17 may extend through from the first principal face 11 to the second principal face 12.

The inside of each light adjusting hole 17 can remain as an air layer. Alternatively, based on the optical characteristics measured after forming the light adjusting holes 17, a member having a lower refractive index than that of the light guide 10 or a light reflecting member can be disposed in the light adjusting holes 17 to correct the optical characteristics.

As shown in FIG. 8A to FIG. 8C, multiple light adjusting holes 17 can be formed in one emission region 9 surrounded by the sectioning grooves 14. Here, examples will be explained in which each emission region 9 is a square in a top view and a light source 20 is positioned in the center of the square.

The light adjusting holes 17 shown in FIG. 8A have the function of reflecting the light from the light source 20 using the lateral faces (inner lateral faces) that face the light source 20. In FIG. 8A, for the sake of explanation, an imaginary first straight line L1 and an imaginary second straight line L2 are provided in the emission region 9. The first straight line L1 is a straight line that connects the center of the light source 20 and one of the furthest points in the sectioning grooves 14 from the center of the light source 20 in the top view of the emission region 9. The second straight line L2 is a straight line that connects the center of the light source 20 and one of the closest points in the sectioning grooves 14 from the center of the light source 20 in the top view of the emission region 9.

When the shape of the emission region 9 is a square and the light source 20 is positioned in the center of the square, the furthest points in the sectioning grooves 14 from the center of the light source 20 are the corners of the emission region 9. When the emission region 9 is a square and the center of the light source 20 coincides with the center of the emission region 9 in the top view, there are four first straight lines L1 and four second straight lines L2.

In the top view shown in FIG. 8A, a light adjusting hole 17 is formed between the light source 20 and each of the four sides of light emission region 9. In other words, the light adjusting holes 17 are formed at the positions that cross the second straight lines L2. The light adjusting holes 17 are formed so as not to cross any first straight lines L1.

In the example shown in FIG. 8A, in a top view, each light adjusting hole 17 is V shaped. More specifically, each light adjusting hole is arranged such that the bent part where two oblique grooves meet faces one side of the light source 20. The light exiting each side of the light source 20 is reflected by the two inner lateral faces of a light adjusting hole 17, and the reflected light advances towards the corners of the emission region 9. In the case in which the inside of the light adjusting holes 17 is configured as the air, the light hitting the part of each light adjusting hole 17 where the two inner lateral faces meet passes through the light adjusting hole 17 without being reflected.

In the example shown in FIG. 8A, each light adjusting hole 17 has a V shape which has line symmetry. Not limited to this, the shape of each light adjusting hole 17 can be adjusted in accordance with the relative positions of the light source 20 and the corners of the emission region such that one of the grooves of the V shape is longer than the other groove, or the two grooves having different angles relative to the center line.

Furthermore, a light adjusting hole 17 may be a groove shaped as a single straight or curved line instead of the shape which combines two straight grooves described above or two curved grooves. In contrast to a light adjusting hole configured as two different angled grooves as in a V shape which reflects light towards two corners, a light adjusting hole configured as a single groove can reflect light towards one corner.

FIG. 8B shows a variation of a light adjusting hole 17. For the sake of explanation, an imaginary first straight line L1 and an imaginary second straight line L2 are provided similar to FIG. 8A.

In the top view shown in FIG. 8B, each light adjusting hole 17 is arranged between the light source 20 and each side of the emission region 9, and in this regard, they are similar to the example shown in FIG. 8A. The light adjusting holes 17 shown in FIG. 8B have the function of refracting the light entering the light adjusting holes 17 through the lateral faces (inner lateral faces) that face the light source 20 using the lateral faces (outer lateral faces) facing the sides of the emission region 9.

In FIG. 8B, the lateral face (inner lateral face) of each light adjusting hole 17 facing the light source 20 parallels a side of the light source 20. The lateral faces (outer lateral faces) of each light adjusting hole facing a side of the emission region 9 are oblique to the side of the emission region 9. The light from the light source 20 passes through the inner lateral face of each light adjusting hole 17, and the light that has entered the light adjusting hole 17 is refracted by the outer lateral faces to advance towards the corners. This can increase the luminance of the corner areas thereby reducing the luminance distribution nonuniformity.

In the example shown in FIG. 8B, the planar shape of a light adjusting hole 17 is a triangle, such as a right triangle, equilateral triangle, or isosceles triangle. It may be a truncated triangular pyramid. The light adjusting holes 17 are not disposed on the first straight lines L1, but cross the second straight lines L2. The outer lateral faces of a light adjusting hole 17 may be curved lines in a top view instead of the straight lines as shown in FIG. 8B. In other words, the top view shape of a light adjusting hole 17 may be semicircular or semi-elliptical.

By forming light adjusting holes 17 such as those shown in FIG. 8B, the direction of travel of a portion of the light exiting the light source 20 and propagating near the second lines L2 can be refracted by the light adjusting holes 17 towards the vicinity of the first straight lines L1 after passing through the light adjusting holes 17. This can increase the luminance of the corners of the emission region 9, thereby reducing the luminance distribution nonuniformity in the emission region 9.

FIG. 8C shows another variation of the light adjusting hole 17. For the sake of explanation, an imaginary first straight line L1 and an imaginary second straight line L2 are provided similar to FIG. 8A.

In the top view shown in FIG. 8C, a light adjusting hole 17 is disposed between the light source 20 and each of the four corners of the emission region 9. The light adjusting holes 17 have the function of refracting the light entering the light adjusting holes 17 through the lateral faces (inner lateral faces) facing the light source 20 using the lateral faces (outer lateral faces) facing the corners of the emission region 9.

In FIG. 8C, the lateral face (inner lateral face) of each light adjusting hole 17 facing the light source 20 is straight line shaped. The lateral face (outer lateral face) of each light adjusting hole facing each corner of the emission region 9 in a top view is curved line shaped. The light from the light source 20 passes through the inner lateral faces of the light adjusting holes 17, and after entering the light adjusting holes 17, the light is refracted by the outer lateral faces to be collected towards the corners. This can increase the luminance in the areas near the corners, thereby reducing the luminance distribution nonuniformity in the emission region 9.

The planar shape of each light adjusting hole 17 shown in FIG. 8C is a piano-concave lens. The concave surface of each light adjusting hole 17 faces a corner of the emission region 9. The light adjusting holes 17 are positioned to cross the first straight lines L1, and are not positioned on any second straight line L2.

Because the interior of each light adjusting hole 17 has a lower refractive index than the refractive index of the light guide 10 and each light adjusting hole 17 has a concave lens shape, an optical action similar to that of a regular convex lens occurs at each light adjusting hole 17 to condense the light passing through the light adjusting hole 17. The light that has passed through the light adjusting holes 17 is refracted in the direction to approach the first straight lines L1 to be condensed in the corners of the emission region 9. This can increase the luminance in the corners of the emission region 9, thereby reducing the luminance distribution nonuniformity in the emission region 9.

Third Embodiment

Figure 9A:
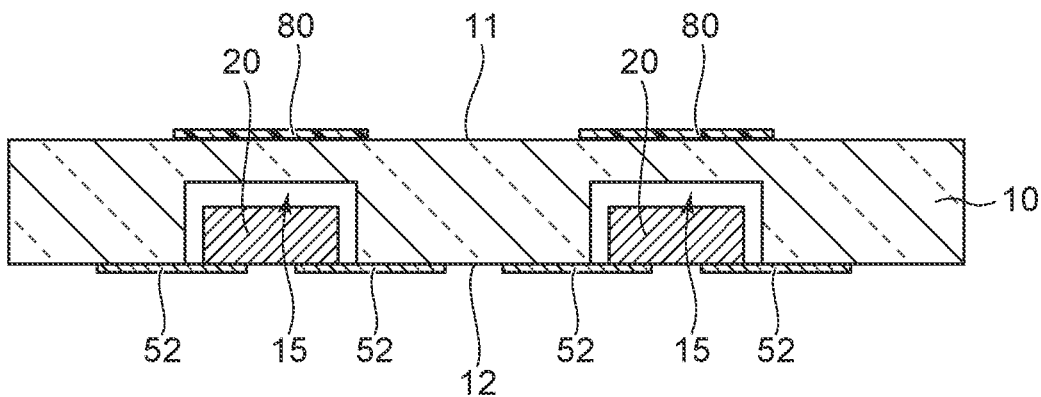
FIG. 9A is a schematic cross-sectional view showing a light emitting module manufacturing process according to a third embodiment of the present disclosure.
Figure 9B:
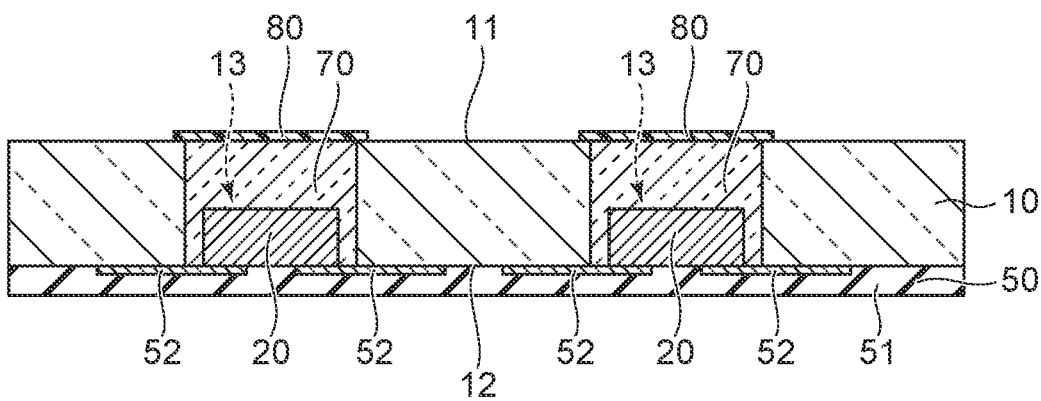
FIG. 9B is a schematic cross-sectional view showing a light emitting module manufacturing process according to the third embodiment of the present disclosure.
Figure 9C:
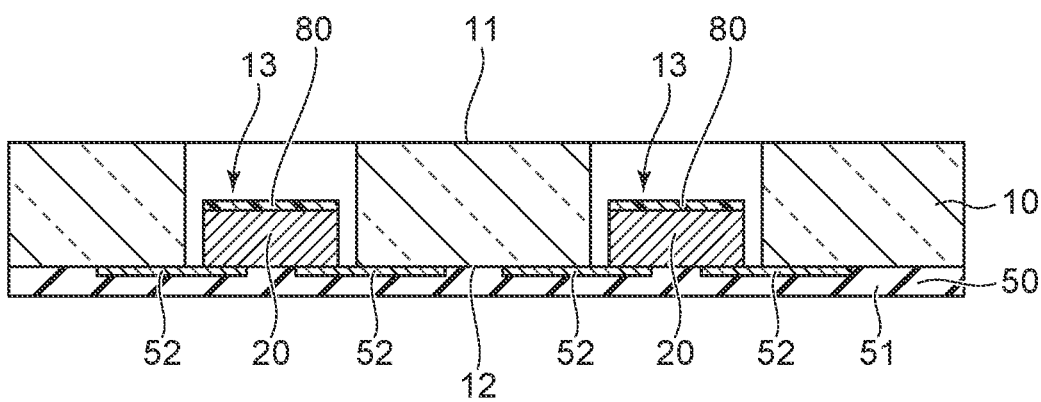
FIG. 9C is a schematic cross-sectional view showing a light emitting module manufacturing process according to the third embodiment of the present disclosure.

FIG. 9A to FIG. 9C are schematic cross-sectional views showing the light emitting module manufacturing processes according to a third embodiment of the present disclosure.

The third embodiment is similar to the other embodiments in terms of including providing an intermediate 111, allowing the light sources 20 in the intermediate 111 to emit light and measuring the optical characteristics of the light exiting the first principal face 11. The third embodiment includes, as a process of forming an optical characteristic correcting element based on the measurements, forming above a light source 20 and/or the area other than the area above the light source 20 a light adjusting member 80 that reflects at least one portion of the light emitted by the light source 20. This can correct the optical characteristics.

Examples of methods of forming a light adjusting member 80 include printing, potting, spraying, sputtering, vapor deposition, adhering a preformed light adjusting member 80, coating, and the like.

As shown in FIG. 9A, in the case of providing an intermediate having light sources 20 disposed in the recesses 15 of the light guide 10, a light adjusting member 80 can be disposed as an optical characteristic correcting element on the first principal face 11 of the light guide 10 located above each light source 20 and/or the area other than the area above each light source 20.

The light adjusting member 80 has a light reflectivity and transmissivity with respect to the light emitted by a light source 20. The light adjusting member 80 can be made of a light transmissive resin containing a light diffusing agent dispersed in the light transmissive resin. The light transmissive resin is, for example, silicone and epoxy. Examples of light diffusing agents include microparticles of $TiO_2$, $SiO_2$, $Al_2O_3$, $ZrO_2$, ZnO and the like.

The light adjusting member 80 disposed directly above a light source 20 can diffuse and reflect a portion of the light exiting upwards from the light source 20 while transmitting the other portion. This can hinder the area directly above a light source 20 from having excessively higher luminance than the area other than the area directly above the light source 20.

For example, disposing a light adjusting member 80 having a relatively low transmittance in the regions having relatively high luminance among the regions directly above the light sources 20 can reduce the luminance distribution nonuniformity in the first principal face 11.

Even in the case of employing an intermediate 111C in which the light sources 20 are encapsulated by the light guide 10C shown in FIG. 3C, a light adjusting member 80 can be disposed as an optical characteristic correcting element on the first principal face 11 of the light guide 10C in the area above a light source 20. The light adjusting member 80 can be disposed across the entire area directly above a light source 20. Alternatively, the light adjusting member 80 may be partially disposed in the area directly above a light source 20 as dots or stripes.

The light adjusting members 80 to be disposed in areas other than the areas directly above the light sources 20 can be disposed on the first principal face 11 of the light guide 10 located between adjacent light sources 20, for example. The positions of the light adjusting members 80 disposed in such locations can be suitably adjusted based on the distance between adjacent light sources 20 and the layout of the light sources 20.

The light adjusting members 80 can be disposed in both the areas directly above the light sources 20 and the areas other than the areas directly above the light sources 20.

FIG. 9B shows an example of providing an intermediate including a light guide 10, light sources 20 and light transmissive members 70 disposed in the first holes 13 of the light guide 10, and disposing light adjusting members 80 as optical characteristic correcting elements on or above the light transmissive members 70 located above the light sources 20. Each light transmissive member 70 covers the upper face and the lateral faces of the light source 20 in each first hole 13. A portion of each light adjusting member 80 may be disposed on the first principal face 11 of the light guide 10.

The light transmissive members 70 have a light transmissivity with respect to the light emitted by the light sources 20, and can be made by using, for example, the same resin as that used for the light guide 10, or a resin having a small refractive index difference from that of the material used for the light guide 10. The transmittance of each light adjusting member 80 is lower than the transmittance of each light transmissive member 70 with respect to the light emitted by the light source 20.

As shown in FIG. 9C, as an intermediate, one provided with a light guide 10 having first holes 13 and light sources 20 disposed in the first holes 13 can be used. This intermediate does not include a light transmissive member in the first holes 13. Light adjusting members 80 can further be disposed as optical characteristic correcting elements on the upper faces of the light sources 20 disposed in the first holes 13. Subsequently, a light transmissive member may be formed in each first hole 13, or retain the air layer in the first hole 13. Furthermore, using an intermediate having light sources 20, light adjusting members 80 on the light sources 20, and light transmissive members covering the light adjusting members 80 in the first holes 13, light adjusting members similar to those shown in FIG. 9B may be disposed as optical characteristic correcting elements on the light transmissive members.

Fourth Embodiment

Figure 10A:
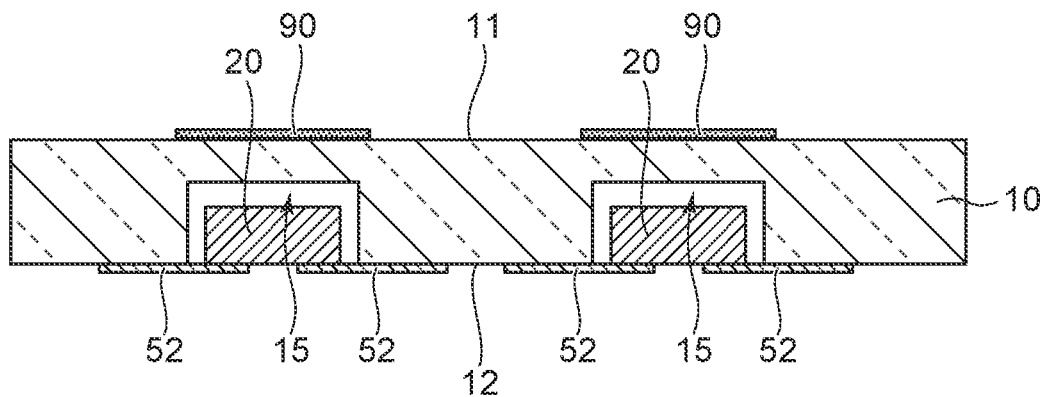
FIG. 10A is a schematic cross-sectional view showing a light emitting module manufacturing process according to a fourth embodiment of the present disclosure.
Figure 10B:
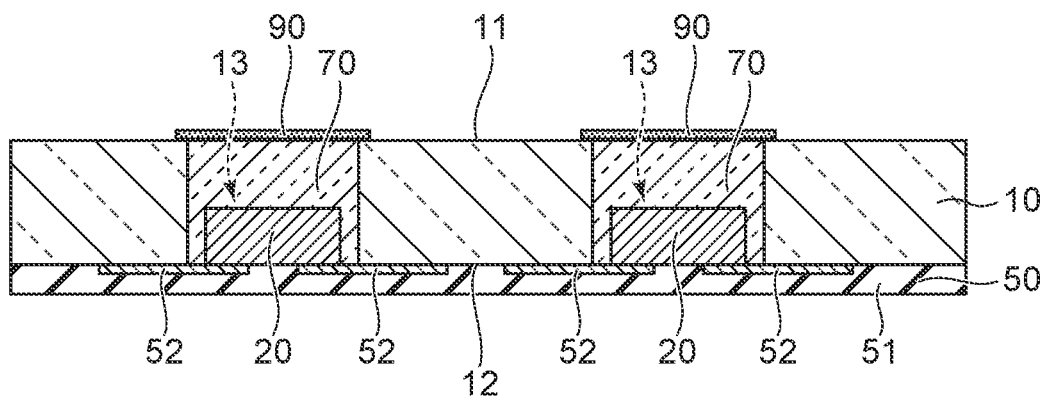
FIG. 10B is a schematic cross-sectional view showing a light emitting module manufacturing process according to the fourth embodiment of the present disclosure.
Figure 10C:
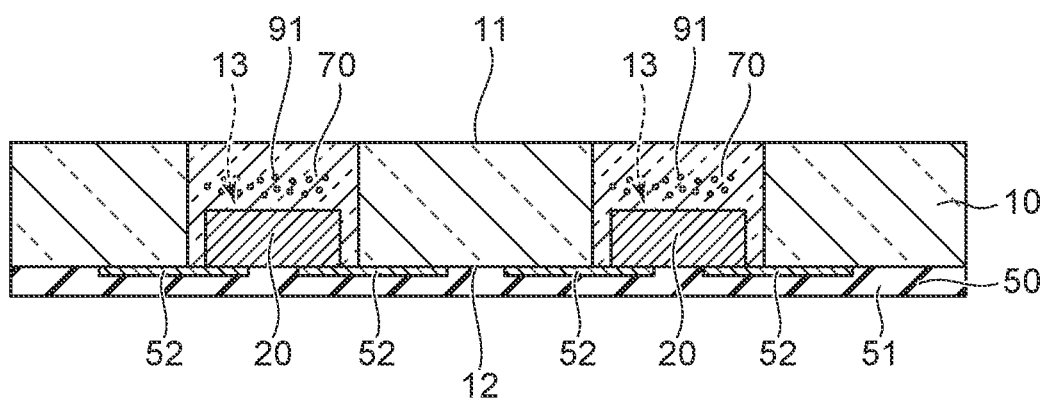
FIG. 10C is a schematic cross-sectional view showing a light emitting module manufacturing process according to the fourth embodiment of the present disclosure.

FIG. 10A to FIG. 10C are schematic cross-sectional view showing light emitting module manufacturing processes according to a fourth embodiment of the present disclosure.

The fourth embodiment is similar to the other embodiments in terms of including providing an intermediate 111, allowing the light sources 20 in the intermediate 111 to emit light and measuring the optical characteristics of the light exiting the first principal face 11. The fourth embodiment includes, as a process of forming optical characteristic correcting elements based on the measurements, forming a phosphor layer above or near the light sources 20. This can correct the optical characteristics.

Examples of methods of forming a phosphor layer includes printing, potting, spraying, sputtering, vapor deposition, adhering a preformed phosphor layer, and the like.

As shown in FIG. 10A, in the case of providing an intermediate having light sources 20 disposed in the recesses 15 of the light guide 10, a phosphor layer 90 can be disposed as an optical characteristic correcting element on the first principal face 11 located above each light sources 20.

Even in the case of providing an intermediate 111C in which light sources 20 are encapsulated by the light guide 10C shown in FIG. 3C, a phosphor layer 90 can be disposed as an optical characteristic correcting element on the first principal face 11 of the light guide 10C located above each light sources 20.

In the fourth embodiment, for example, the chromaticity distribution is measured as the optical characteristics by allowing the light sources 20 containing or not containing a phosphor to emit light. Based on the measurements, the phosphor layer 90 can be disposed as an optical characteristic correcting element, for example, in the regions in which the tinge of the light emitted by the phosphor is relatively deficient. This can reduce the chromaticity distribution nonuniformity in the first principal face 11.

FIG. 10B shows an example in which an intermediate is provided by disposing light sources 20 and light transmissive members 70 in the first holes 13 of a light guide 10, and a phosphor layer 90 is disposed as optical characteristic correcting elements on the light transmissive members 70 located above the light sources 20.

In the example shown in FIG. 10C, a liquid light transmissive resin containing a phosphor 91 is supplied as an optical characteristic correcting element in each first hole 13, which is subsequently hardened. In this manner the light transmissive members 70 are formed in the first holes 13. At this time, adjusting the composition and the amount of the phosphor 91 to be contained in the liquid (uncured) light transmissive resin based on the measured optical characteristics (chromaticity distribution) can correct the chromaticity thereby reducing the chromaticity distribution nonuniformity.

Fifth Embodiment

Figure 11A:
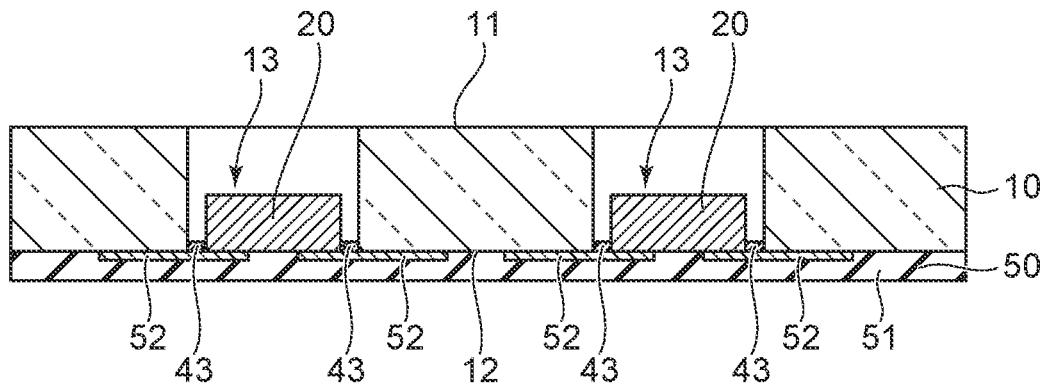
FIG. 11A is a schematic cross-sectional view showing a light emitting module manufacturing process according to a fifth embodiment of the present disclosure.

FIG. 11A is a schematic cross-sectional view showing a light emitting module manufacturing process according to a fifth embodiment of the present disclosure. The intermediate provided in the fifth embodiment has a structure in which light sources 20 are disposed in the first holes 13 of a light guide 10.

Figure 19:
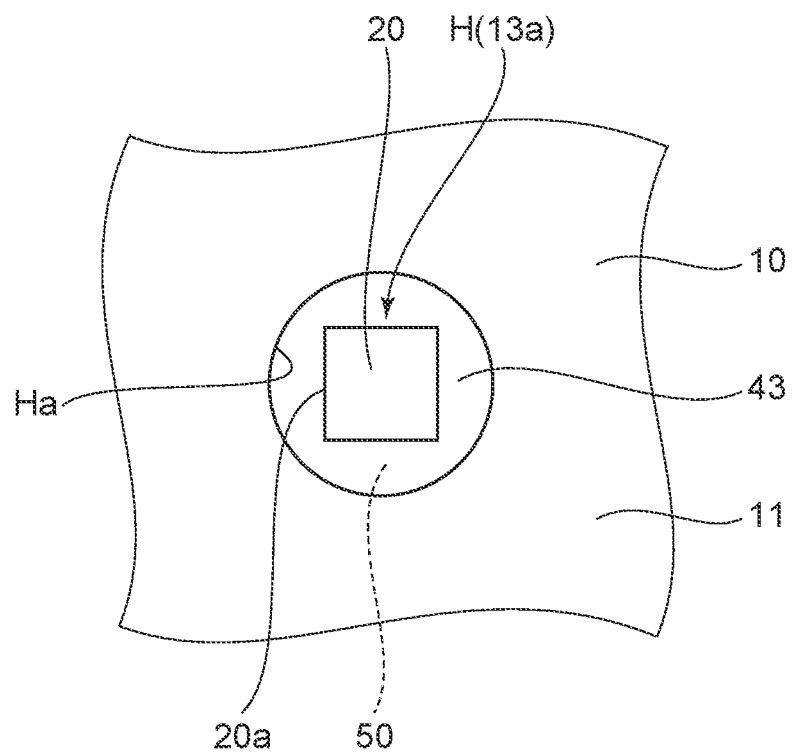
FIG. 19 is a schematic top view showing the relative positions of a light source in a first hole and a light reflecting member in the embodiments shown in FIG. 11A and FIG. 17.

FIG. 19 is a schematic top view of a first hole 13 and a light source 20 disposed in the first hole 13 when viewed from the first principal face 11 side of the light guide 10.

The fifth embodiment is similar to the other embodiments in terms of including providing an intermediate 111, allowing the light sources 20 in the intermediate to emit light and measuring the optical characteristics of the light exiting the first principal face 11. As a process of forming an optical characteristic correcting element based on the measurements, a light reflecting member 43 is formed on the wiring substrate 50 between the inner lateral face of the first hole 13 and the lateral faces of the light source 20 as shown in FIG. 19. This can correct the optical characteristics.

Examples of methods of forming a light reflecting member 43 include potting, spraying, sputtering, vapor deposition, adhering a preformed light reflecting member 43, and the like.

The light reflecting member 43 is disposed on the wiring substrate 50 around the light source 20 in each first hole 13. The light reflecting member 43 has a light reflectivity with respect to the light emitted by the light source 20. The light reflecting member 43, for example, is a white light transmissive resin member containing as a light diffusing agent microparticles of $TiO_2$, $SiO_2$, $Al_2O_3$, $ZrO_2$, ZnO and the like.

When the luminance around a light source 20 is low as a result of measuring the optical characteristics, a light reflecting member 43 can be disposed to increase the luminance around the light source 20.

Figure 11B:
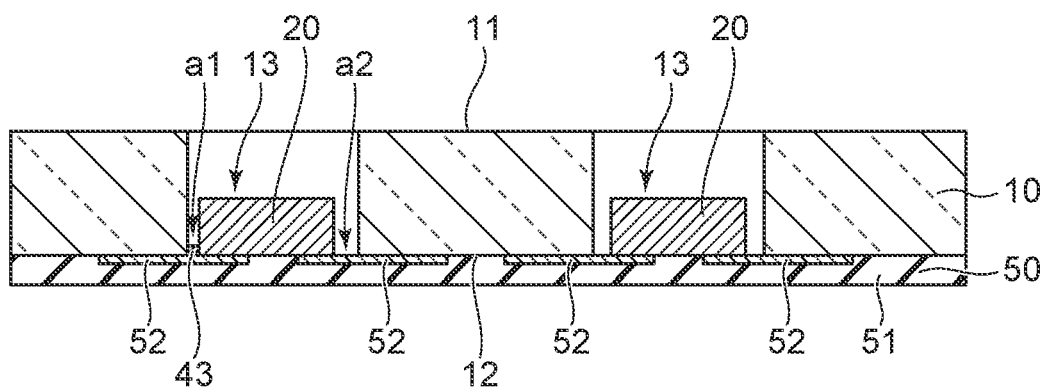
FIG. 11B is a schematic cross-sectional view showing a light emitting module manufacturing process according to the fifth embodiment of the present disclosure.

In an intermediate in which light sources 20 are disposed in the first holes 13 of a light guide 10, the positions of the light sources 20 in the first holes 13 in a planar direction could vary. For example, the light source 20 shown on the left-hand side in the cross section in FIG. 11B is positioned more to the left than the central position in the first hole 13. Thus, the distances between the lateral faces and the inner lateral face of the first hole 13 are circumferentially nonuniform around the light source 20.

In other words, the first hole 13 includes a first region a1 having a first distance between the inner lateral face of the first hole 13 and the lateral face of the light source 20, and a second region a2 having a second distance which is larger than the first distance between the inner lateral face of the first hole 13 and the lateral face of the light source 20. In this case, the luminance in the first region a1 tends to be higher than the luminance in the second region a2.

In such a case, disposing a light reflecting member 43 on the wiring substrate 50 in the first region a1 and not disposing the light reflecting member 43 on the wiring substrate 50 in the second region a2 allows the light reflecting member 43 to scatter the light in the first region a1 to hinder the first region a1 from having excessively higher luminance than the luminance in the second region a2. In other words, this can correct the circumferential luminance distribution nonuniformity around the light source 20 attributable to the varied position of the light source 20 in the first hole 13.

Furthermore, in an intermediate in which light sources 20 are disposed in the first holes 13 of a light guide 10, the positions of the first holes 13 themselves can vary. The varied positions of the first holes 13 cause the distances between adjacent first holes 13 to vary. In this case, even if the light sources 20 were positioned in the center of the first holes 13, the distances between adjacent light sources 20 would vary.

Figure 11C:
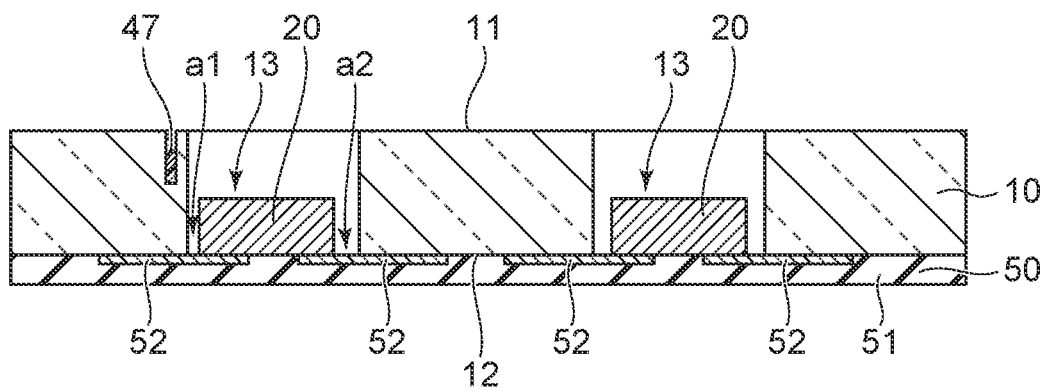
FIG. 11C is a schematic cross-sectional view showing a light emitting module manufacturing process according to a sixth embodiment of the present disclosure.
Figure 11D:
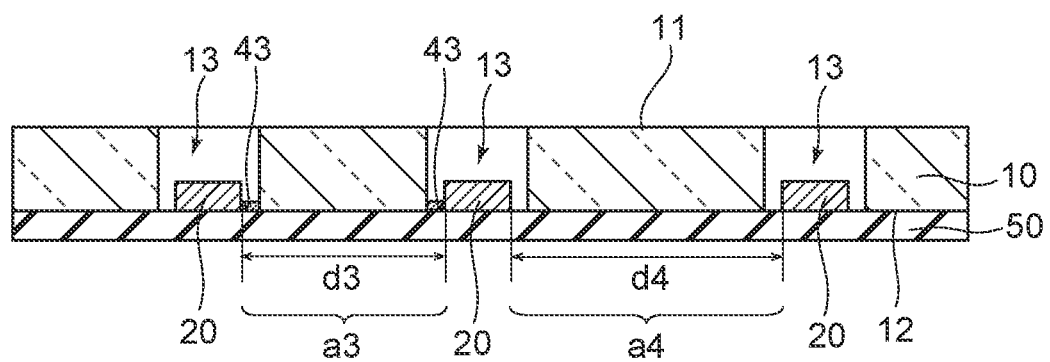
FIG. 11D is a schematic cross-sectional view showing a light emitting module manufacturing process according to the fifth embodiment of the present disclosure.

In the example shown in FIG. 11D, because of the varied positions of the first holes 13, the light guide 10 has a third region a3 having a third distance d3 between adjacent light sources 20, and a fourth region a4 having a fourth distance d4 which is larger than the third distance d3 between adjacent light sources 20. In this case, the luminance in the third region a3 tends to be higher than the luminance in the fourth region a4.

In such a case, disposing a light reflecting member 43 on the wiring substrate 50 in the first hole 13 in the third region a3 allows the light reflecting member 43 to scatter the light in the third region a3 to hinder the third region a3 from having excessively higher luminance than the luminance in the fourth region a4.

Sixth Embodiment

FIG. 11C is a schematic cross-sectional view showing a light emitting module manufacturing process according to a sixth embodiment of the present disclosure.

In the intermediate shown in FIG. 11C, for example, the light source 20 in the first hole 13 on the left is positioned more to the left than the central position in the first hole 13. For this reason, the distances between the lateral faces of the light source 20 and the inner lateral face of the first hole 13 are circumferentially nonuniform around the light source 20.

In the sixth embodiment, a groove is formed as an optical characteristic correcting element in the light guide 10 on the first region a1 side in the cross section shown in FIG. 11C which includes the first region a1, the second region a2, and the light source 20 between the first region a1 and the second region a2. A light reflecting wall part 47 is further formed in the groove. Alternatively, the inside of the groove may be an air layer. This can correct the optical characteristics.

Examples of methods of forming a wall part 47 include, subsequent to forming a groove by laser beam irradiation or the like, disposing a light reflecting member in the groove by potting, spraying, printing, or the like.

The wall part 47 (or the groove), as shown in FIG. 11C, can be formed to a depth such that the bottom thereof is higher than the upper face of the light source 20. Not limited to this, the depth of the wall part 47 can be suitably adjusted in accordance with the optical characteristics. Moreover, in a top view, the width of the wall part 47 can be the same as the width of the light source 20 or larger. Alternatively, in a top view, the width of the wall part can be larger than the width of the first hole 13. The angle of the wall part 47 in a cross section can be such that the wall part is in parallel with the thickness direction of the light guide 10 as shown in FIG. 11C. Alternatively, the wall part 47 can have a lateral face oblique to the thickness direction of the light guide 10. The distance between the wall part 47 and the first hole 13, for example, can be equal to the distance between the inner lateral face of the first hole 13 and lateral face of the light source 20.

For example, the wall part 47 is a white resin member formed in the groove that is formed from the first principal face 11 side in the part of the light guide 10 on the first region a1 side. The white resin member, for example, is a white light transmissive resin material containing as a light diffusing agent microparticles of $TiO_2$, $SiO_2$, $Al_2O_3$, $ZrO_2$, ZnO and the like.

In the direction paralleling the first principal face 11, the distance between the wall part 47 and the first region a1 is smaller than the distance between the wall part 47 and the second region a2. A portion of the wall part 47 may face the lateral face of the light source 20 on the first region a1 side.

The light emitted diagonally upwards from the lateral face of the light source 20 on the first region a1 side is reflected off the wall part 47 to advance towards the second region a2. This can hinder the first region a1 from having excessively higher luminance than the luminance in the second region a2. In other words, the circumferential luminance distribution nonuniformity around the light source 20 attributable to the varied position of the light source 20 in the first hole 13 can be corrected.

Figure 11E:
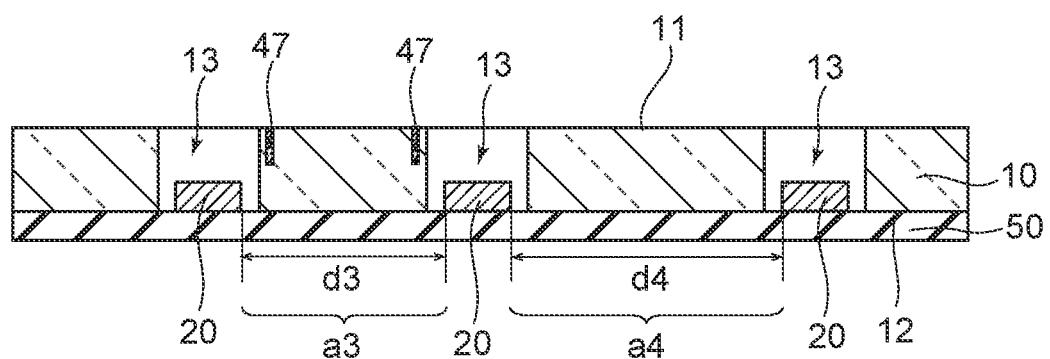
FIG. 11E is a schematic cross-sectional view showing a light emitting module manufacturing process according to the sixth embodiment of the present disclosure.

In the example shown in FIG. 11E, because of the varied positions of the first holes 13, the light guide 10 has a third region a3 having a third distance between adjacent light sources 20 and a fourth region a4 having a fourth distance which is larger than the third distance d3 between adjacent light sources 20.

In such a case, forming a groove or the light reflecting wall part 47 described above in the light guide 10 in the third region a3 allows the light emitted diagonally upwards from the lateral face of the light source 20 on the third region a3 side to be reflected off the wall part 47 (or the groove) to advance towards the fourth region a4. This can hinder the third region a3 from having excessively higher luminance than the luminance in the fourth region a4. The wall part 47 disposed in the third region a3 may be disposed only in the vicinity of the light source 20 adjacent to the fourth region a4 (the light source 20 in the center in FIG. 11E), or only in the vicinity of the light source 20 not adjacent to the fourth region a4 (the light source 20 on the left in FIG. 11E). The wall part 47 (or the groove) is disposed at a position closer to a light source 20 than to the midpoint between the two light sources 20 separated by the third distance d3. In the case in which a sectioning groove 14 described earlier is created in the light guide 10 in the third region a3, the wall part 47 (or a groove) is disposed at a position closer to the light source 20 than the sectioning groove 14.

Seventh Embodiment

Figure 12A:
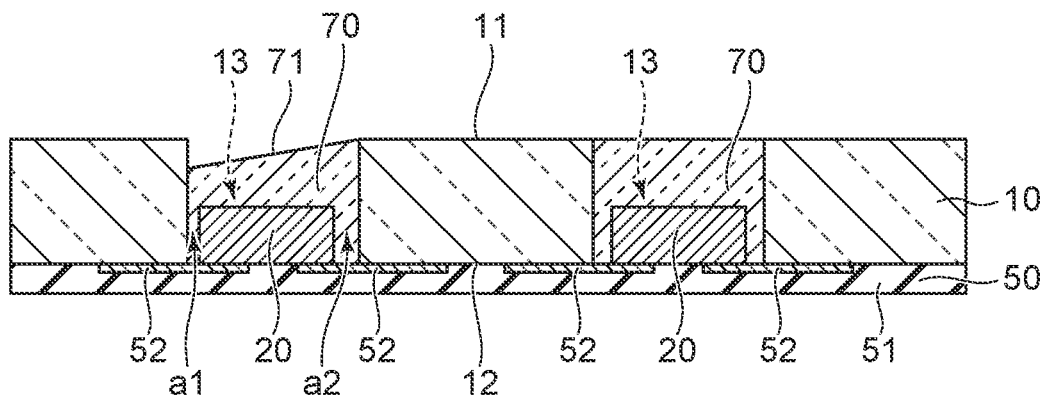
FIG. 12A is a schematic cross-sectional view showing a light emitting module manufacturing process according to a seventh embodiment of the present disclosure.
Figure 12B:
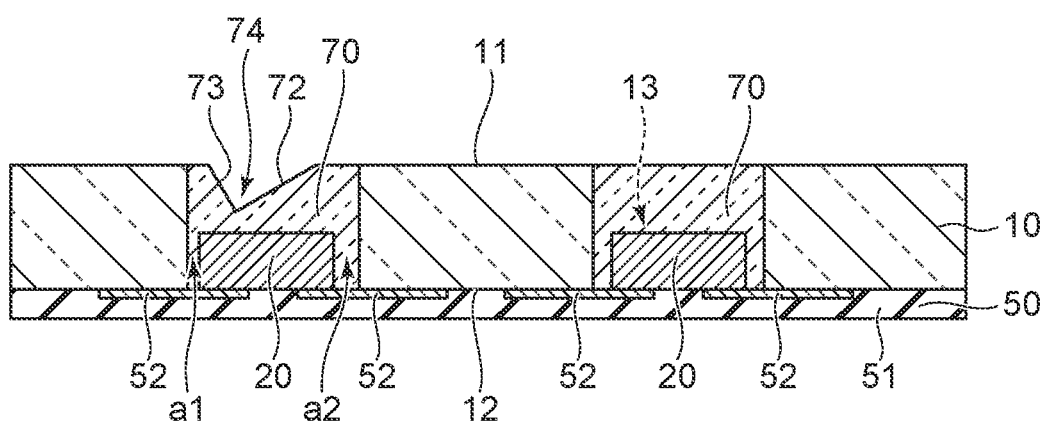
FIG. 12B is a schematic cross-sectional view showing a light emitting module manufacturing process according to the seventh embodiment of the present disclosure.

FIG. 12A and FIG. 12B are schematic cross-sectional views showing light emitting module manufacturing processes according to a seventh embodiment of the present disclosure.

The process of forming an optical characteristic correcting element in the seventh embodiment includes disposing a light transmissive member 70 in the first holes 13 as the optical characteristic correcting element.

The luminance and/or the chromaticity of the intermediate having light sources 20 disposed in the first holes 13 are measured. Based on the measurements, the refractive index of the light transmissive members 70 to be disposed as the optical characteristic correcting elements are selected for the light sources 20. This can reduce the luminance distribution and/or chromaticity distribution nonuniformity in the first principal face 11. For example, the refractive index of a light transmissive member 70 can be selected among the three: the same refractive index as that of the base material for the light sources 20 (e.g., the light transmissive member 25 shown in FIG. 4A); a higher refractive index than that of the base material for the light sources 20; and a lower refractive index than that of the base material for the light sources 20.

As shown in FIG. 12A, for example, the light source 20 disposed in the first hole 13 on the left is positioned more to the left than the central position in the first hole 13. For this reason, the distances between the lateral faces of the light source 20 and the inner lateral face of the first hole 13 are circumferentially nonuniform around the light source 20. In such a case, as an optical characteristic correcting element, an oblique face 71 can be formed at the upper face of the light transmissive member 70 which is oblique to the first principal face 11. This can correct the optical characteristic nonuniformity attributable to the varied position of the light source 20.

The oblique face 71 is in contact with a member having a lower refractive index than that of the light transmissive member 70 or the air. This allows the light exiting the light source 20 to be totally reflected by the oblique face 71. The oblique face 71 is inclined such that the first region a1 side is lower than the second region a2 side. Specifically, the upper face of the light transmissive member 70 is configured as a single oblique face 71 in a cross-sectional view. In other words, the lowest part of the oblique face 71 of the light transmissive member 70 is positioned to be in contact with the inner lateral face of the first hole 13. By providing a single oblique face 71 immediately above the light source 20 in this manner, the light from the light source 20 can be reflected by the single oblique face 71. Here, the light from the light source 20 tends to be reflected more towards the second region a2 than towards the first region a1. This can hinder the first region a1 from having excessively higher luminance than the luminance in the second region a2. In other words, the circumferential luminance nonuniformity around the light source 20 attributable to the varied position of the light source 20 in the first hole 13 can be corrected.

In the example shown in FIG. 12B, an depressed part 74 having a V shape in a cross section, for example, is created in the upper face of the light transmissive member 70. The inner faces of the depressed part 74 include a first oblique face 72 and a second oblique face 73 oblique to the first principal face 11 in a cross section. The depressed part 74 can have a pyramidal shape, such as a triangular pyramid or quadrangular pyramid, or a conical shape. Alternatively, the depressed part 74 can have a truncated pyramid shape, such as a truncated triangular pyramid or truncated quadrangular pyramid, or a truncated conical shape.

In the case of a conical depressed part 74, in a cross-sectional view, the first oblique face 72 is inclined such that the first region a1 side is lower than the second region a2 side. The second oblique face 73 is inclined such that the second region a2 side is lower than the first region a1 side. The lower end of the first oblique face 72 and the lower end of the second oblique face 73 which form the bottom of the depressed part 74 are positioned above the light source 20 at a position closer to the first region a1 than to the second region a2.

The example shown in FIG. 12B having a second oblique face 73 can increase the component of light reflected towards the first region a1 as compared to the example shown in FIG. 12A. In other words, because the depressed part of the light transmissive member 70 shown in FIG. 12A has a single oblique face 71 above the light source 20 in a cross section, the light exiting the light source 20 upwards can be reflected in one direction. In contrast, because the depressed part 74 shown in FIG. 12B has two oblique faces 72 and 73 above the light source in a cross section, the light exiting the light source 20 upwards can be reflected in two directions. The luminance nonuniformity can be reduced by adjusting the lowest position of the oblique face 71 or the lowest positions of the oblique faces 72 and 73 in correspondence with the amount of deviation in the position of a light source 20.

For example, an depressed part having oblique faces 71 to 73 can be formed by dispensing a material for forming the light transmissive member 70 in a first hole 13 followed by placing a die having a protruding part with an oblique face or oblique faces and hardening the material. Alternatively, the oblique faces 71 to 73 can be created by forming a light transmissive member 70 having an upper face coplanar with the first principal face 11 of the light guide 10 followed by partially removing the light transmissive member 70 by grinding with a router or the like.

Eighth Embodiment

Figure 13A:
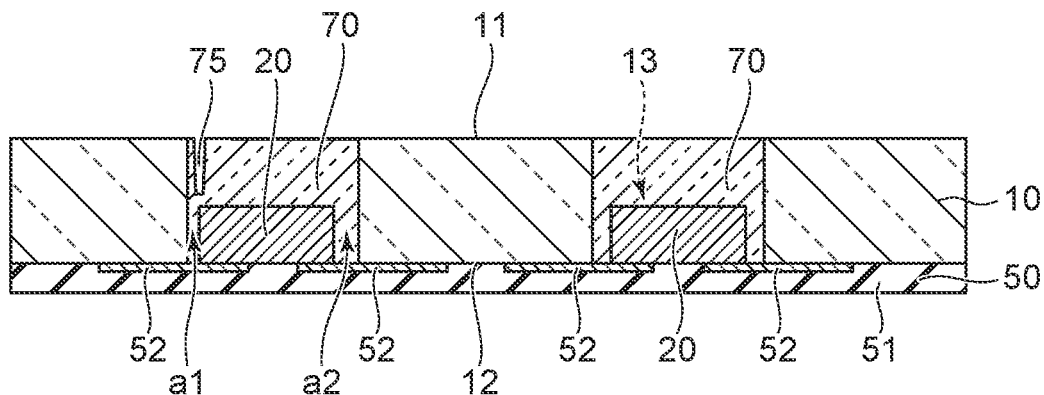
FIG. 13A is a schematic cross-sectional view showing a light emitting module manufacturing process according to an eighth embodiment of the present disclosure.

FIG. 13A is a schematic cross-sectional view showing a light emitting module manufacturing process according to an eighth embodiment of the present disclosure.

The process of forming an optical characteristic correcting element in the eighth embodiment includes forming a groove 75 in the light transmissive member 70 as the optical characteristic correcting element.

As shown in FIG. 13A, for example, the light source 20 disposed in the first hole 13 on the left is positioned more to the left than the central position in the first hole 13. For this reason, the distances between the lateral faces of the light source 20 and the inner lateral face of the first hole 13 are circumferentially nonuniform around the light source 20. In such a case, forming a groove 75 as an optical characteristic correcting element in the light transmissive member 70 on the first region a1 side can correct the optical characteristic nonuniformity attributable to the varied position of the light sources 20.

For example, the groove 75 can be filled with a material having a lower refractive index than that of the light transmissive member 70 or remain as an air layer. This allows the light exiting the light source 20 to be totally reflected off the interface between the groove 75 and the light transmissive member 70.

The light emitted diagonally upwards from the light source 20 towards the groove 75 is reflected at the interface between the groove 75 and the light transmissive member 70 to advance towards the second region a2. This can hinder the first region a1 from having excessively higher luminance than the luminance in the second region a2. In other words, the circumferential luminance distribution nonuniformity around the light source 20 attributable to the varied position of the light source 20 in the first hole 13 can be corrected.

Figure 13B:
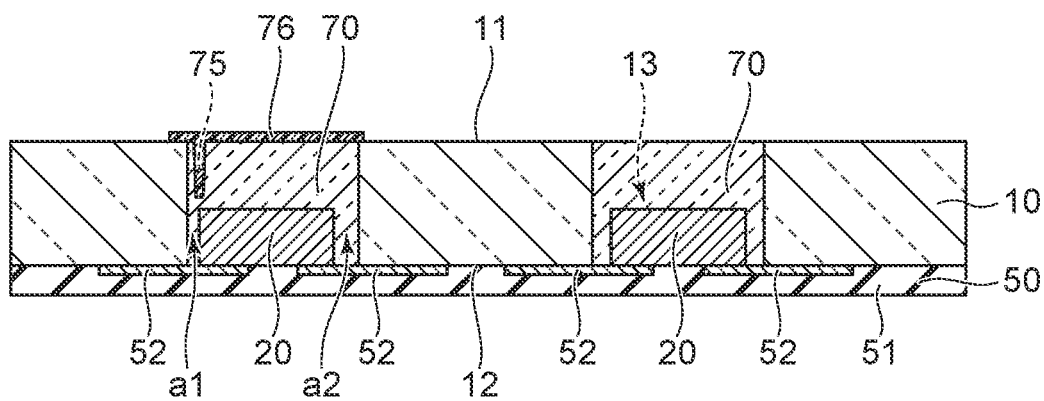
FIG. 13B is a schematic cross-sectional view showing a light emitting module manufacturing process according to the eighth embodiment of the present disclosure.

As show in FIG. 13B, a light reflecting member 76 may be formed in the groove 75. The light emitted diagonally upwards from the light source 20 towards the light reflecting member 76 can be reflected by the light reflecting member 76 to advance towards the second region a2. This can hinder the first region a1 from having excessively higher luminance than the luminance in the second region a2.

For the light reflecting member 76, for example, the same material as that employed for the light adjusting members 80 shown in FIG. 9A to FIG. 9C can be used. The light reflecting member 76 may be disposed on the upper face of the light transmissive member 70. The light reflecting member 76 disposed on the upper face of the light transmissive member 70 can function similarly to the light adjusting members 80 described above.

Examples of methods of forming a groove 75 include laser beam irradiation and the like. Examples of methods of forming a light reflecting member 76 include potting, spraying, printing, and the like.

The groove 75, as shown in FIG. 13A, can be formed to a depth such that the bottom thereof is positioned higher than the upper face of the light source 20. Moreover, in a top view, the width of the groove 75 can be the same as the width of the light source 20 or larger. The angle of the groove 75 in a cross section can be such that the groove is in parallel with the thickness direction of the light guide 10 as shown in FIG. 13A. Alternatively, the groove 75 can have a lateral face which is oblique to the thickness direction of the light guide 10. The groove 75 is preferably disposed above an edge of the upper face or outward from directly upper portion of the upper face of the light source 20 in a cross section.

Ninth Embodiment

Figure 14A:
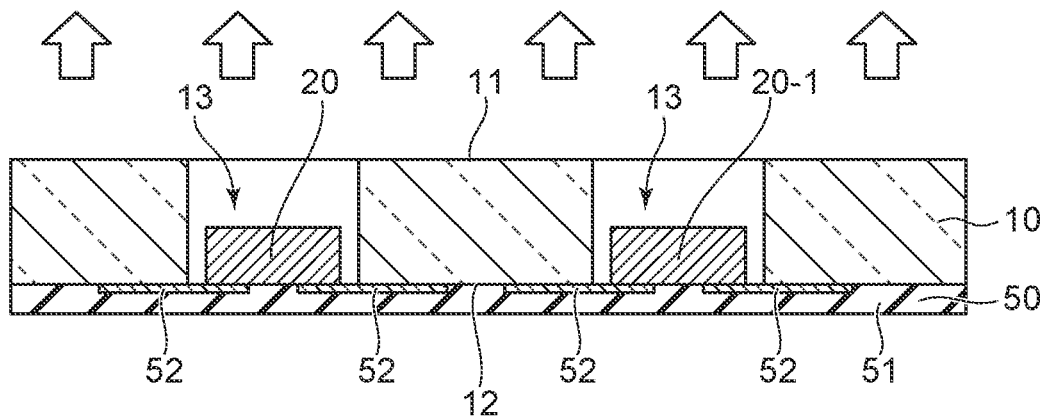
FIG. 14A is a schematic cross-sectional view showing a light emitting module manufacturing process according to a ninth embodiment of the present disclosure.
Figure 14B:
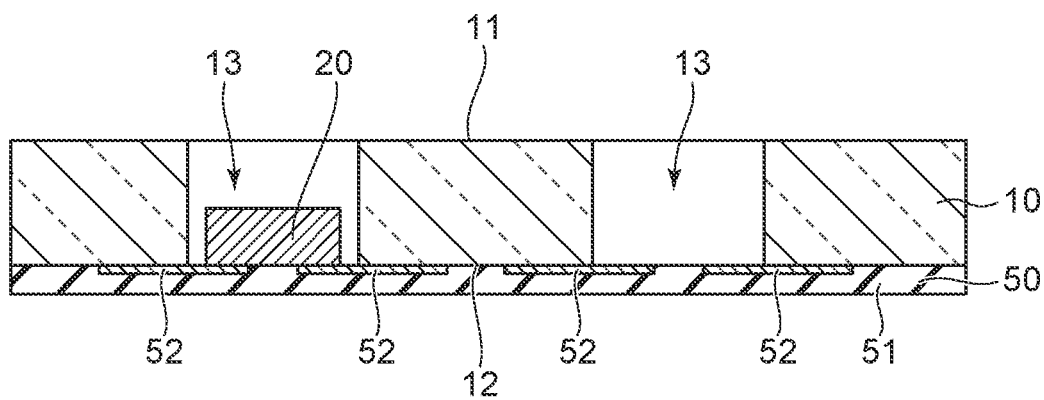
FIG. 14B is a schematic cross-sectional view showing a light emitting module manufacturing process according to the ninth embodiment of the present disclosure.
Figure 14C:
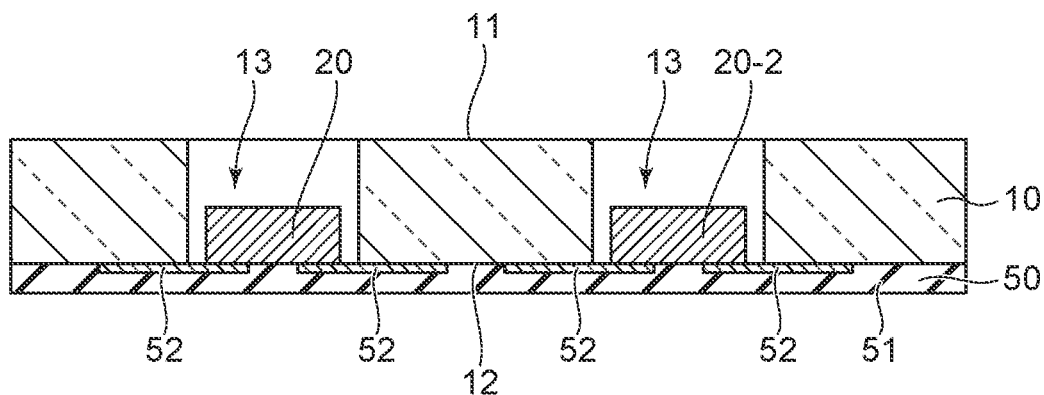
FIG. 14C is a schematic cross-sectional view showing a light emitting module manufacturing process according to the ninth embodiment of the present disclosure.

FIG. 14A to FIG. 14C are schematic cross-sectional views showing light emitting module manufacturing processes according to a ninth embodiment of the present disclosure.

In the ninth embodiment, as shown in FIG. 14A, an intermediate is provided which includes a wiring substrate 50, a light guide 10 disposed on the wiring substrate 50, and a plurality of light sources 20 disposed in the first holes 13 of the light guide 10. No light transmissive member is formed in the first holes 13. The electrodes 23 of each light source 20 described earlier are connected to the wiring layer 52, for example, via solder.

All or selected light sources 20 in the intermediate are allowed to emit light to measure the optical characteristics of the light exiting the first principal face 11.

In the ninth embodiment, the optical characteristics are corrected by replacing a certain light source 20 with another light source 20 on the wiring substrate 50 based on the measured optical characteristics.

In FIG. 14A, in the case in which the luminance and/or the chromaticity of the light source 20-1 shown on the right deviated from the luminance and/or the chromaticity of the other light source 20, for example, the light source 20-1 will be replaced.

By applying heat to the intermediate, the solder is melted, and the light source 20-1 is removed from the wiring substrate 50 (FIG. 14B). Then, as shown in FIG. 14C, another light source 20-2 is placed in the position on the wiring substrate 50 from which the light source 20-1 has been removed. The solder is melted to connect the electrodes 23 of the light source 20-2 to the wiring layer 52. The light source 20-1 is removed from and the light source 20-2 is placed on the wiring substrate 50 through the first hole 13 of the light guide 10.

In the ninth embodiment, in addition to the process of allowing the light sources 20 to emit light and measuring the optical characteristics, a light source 20-1 can be replaced with another light source 20-2 based on the measured positions of the light sources 20 by measuring the positions of the light sources 20 on the wiring substrate and replacing the light source 20-1.

Tenth Embodiment

FIG. 15A to FIG. 15D are schematic cross-sectional views showing light emitting module manufacturing processes according to a tenth embodiment of the present disclosure.

Figure 15A:
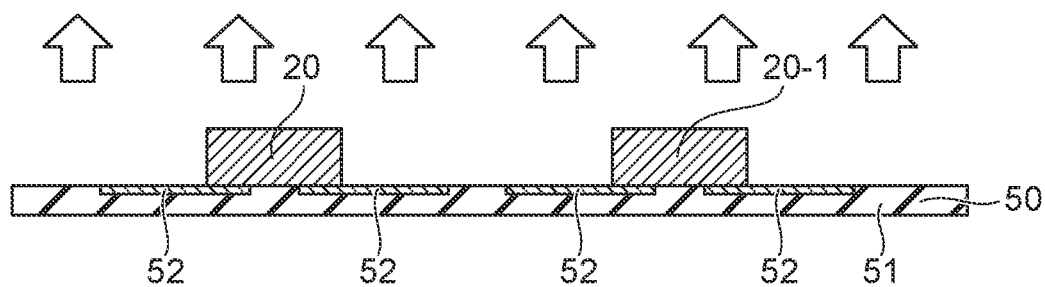
FIG. 15A is a schematic cross-sectional view showing a light emitting module manufacturing process according to a tenth embodiment of the present disclosure.

In the tenth embodiment, as shown in FIG. 15A, an intermediate is provided which includes a wiring substrate 50 and a plurality of light sources 20 disposed on the wiring substrate 50. This intermediate does not include a light guide 10. The electrodes 23 of each light source 20 are connected to the wiring layer 52, for example, via solder. All or selected light sources 20 in the intermediate are allowed to emit light to measure the optical characteristics of the emitted light.

In FIG. 15A, in the case in which the luminance and/or the chromaticity of the light source 20-1 shown on the right deviated from the luminance and/or the chromaticity of the other light source 20, the light source 20-1 will be replaced.

Figure 15B:
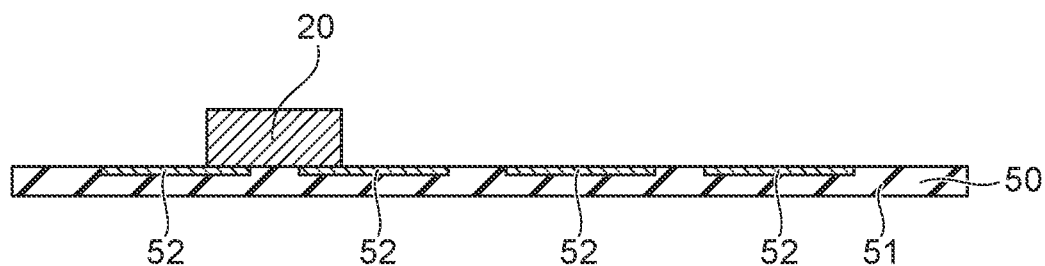
FIG. 15B is a schematic cross-sectional view showing a light emitting module manufacturing process according to the tenth embodiment of the present disclosure.
Figure 15C:
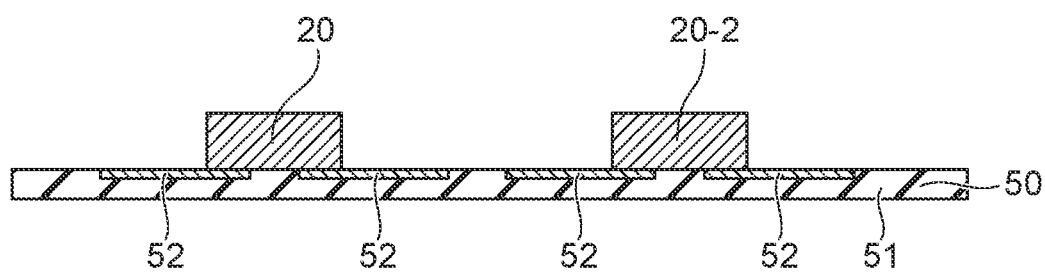
FIG. 15C is a schematic cross-sectional view showing a light emitting module manufacturing process according to the tenth embodiment of the present disclosure.

By applying heat to the intermediate, the solder is melted, and the light source 20-1 is removed from the wiring substrate 50 (FIG. 15B). Then, as shown in FIG. 15C, another light source 20-2 is placed in the position on the wiring substrate 50 from which the light source 20-1 has been removed. The solder is melted to connect the electrodes 23 of the light source 20-2 to the wiring layer 52.

Figure 15D:
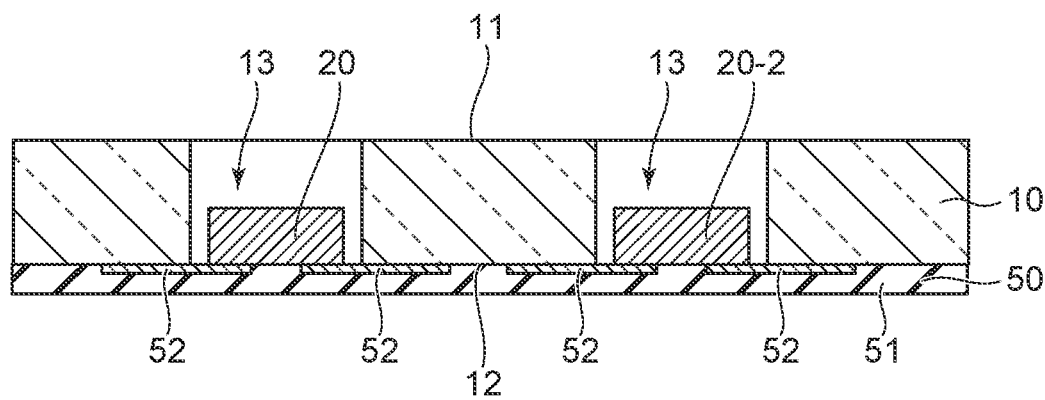
FIG. 15D is a schematic cross-sectional view showing a light emitting module manufacturing process according to the tenth embodiment of the present disclosure.

After placing the light source 20-2 on the wiring substrate 50, as shown in FIG. 15D, a light guide 10 is disposed on the wiring substrate 50. The light guide 10 has first holes 13, and the light sources 20 are placed in the first holes 13. Subsequently, the optical characteristics can be measured by lighting the light sources 20 with the light guide 10 in place, and any of the processes of forming an optical characteristic correcting element in the embodiments described above can be performed.

According to the tenth embodiment, the light source 20-1 can be removed and the light source 20-2 can be bonded to the wiring layer 52 by melting the solder by applying heat in the absence of a light guide 10. This makes it possible to use a low heat resistant material for the light guide 10.

In the tenth embodiment, moreover, in addition to the process of allowing the light sources 20 to emit light and measuring the optical characteristics, a light source 20-1 can be replaced with another light source 20-2 by measuring the positions of the light sources 20 on the wiring substrate prior to disposing a light guide 10 on the wiring substrate 50, and replacing the light source 20-1 based on the measured positions of the light sources 20.

Eleventh Embodiment

Figure 16A:
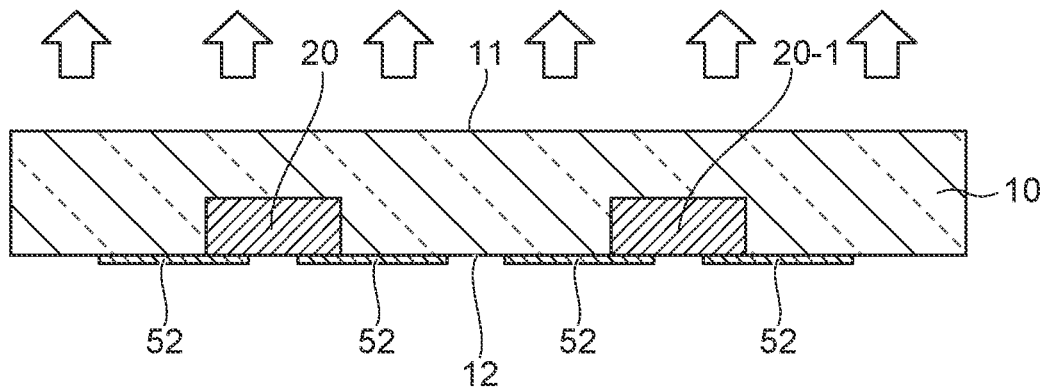
FIG. 16A is a schematic cross-sectional view showing a light emitting module manufacturing process according to an eleventh embodiment of the present disclosure.
Figure 16B:
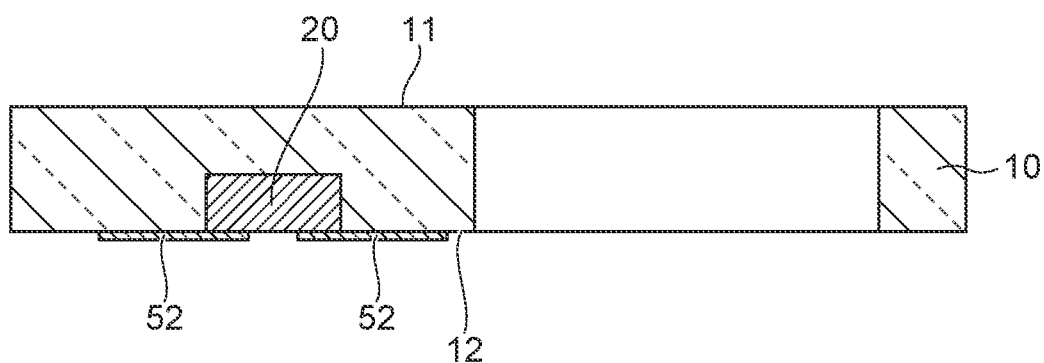
FIG. 16B is a schematic cross-sectional view showing a light emitting module manufacturing process according to the eleventh embodiment of the present disclosure.
Figure 16C:
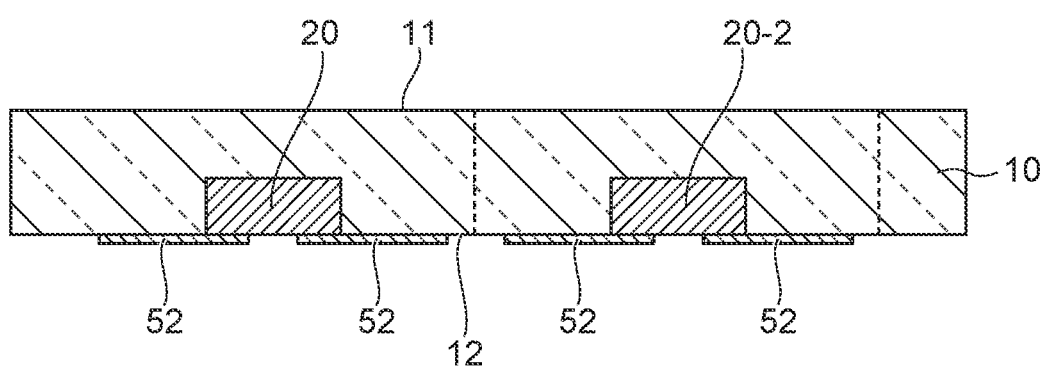
FIG. 16C is a schematic cross-sectional view showing a light emitting module manufacturing process according to the eleventh embodiment of the present disclosure.

FIG. 16A to FIG. 16C are schematic cross-sectional views showing light emitting module manufacturing processes according to an eleventh embodiment of the present disclosure.

In the eleventh embodiment, as shown in FIG. 16A, an intermediate is provided which has a light guide 10, a plurality of light sources 20, and a wiring layer 52 electrically connected to the light sources 20. The light guide 10 is integrated with the light sources 20, encapsulating the light sources 20 so as to cover the upper faces and the lateral faces of the light sources 20. Alternatively, recesses 15 are formed in the light guide 10 as shown in FIG. 3B, for example, and the light sources 20 are disposed in the recesses 15. The wiring layer 52 is disposed on the second principal face 12 of the light guide 10, and connected to the electrodes 23 of the light sources 20 described earlier.

All or selected light sources 20 in the intermediate are allowed to emit light to measure the optical characteristics of the light exiting the first principal face 11. The eleventh embodiment further includes replacing a section of the light guide 10 together with a light source 20 with another section having a light source 20 based on the measured optical characteristics.

In FIG. 16A, for example, in the case in which the luminance and/or the chromaticity of the light source 20-1 shown on the right deviated from the luminance and/or the chromaticity of the other light source 20, the light source 20-1 will be replaced.

The light source 20-1 is removed together with a section of the light guide (the light guide portions above and surrounding the light source 20-1) from the intermediate (FIG. 16B). The wiring layer 52 disposed on the second principal face 12 and connected to the light source 20-1 is also removed together with the light source 20-1.

Then, as shown in FIG. 16C, another light source 20-2 together with a light guide section (the light guide portions above and surrounding the light source 20-2) is placed in the portion of the intermediate from which the light source 20-1 has been removed. After placing the light source 20-2 together with the light guide section, a wiring layer 52 to be connected to the light source 20-2 is disposed on the second principal face 12 of the light guide 10. Alternatively, the wiring layer 52 can be integrally placed with the light source 20-2 and the section of the light guide 10.

In each of the embodiments described above, for example, the light emitting module manufacturing processes progress in the state in which a plurality of light sources 20 are combined with a light guide 10 larger than a product size, and the light guide 10 is ultimately divided into parts each having at least one light source 20 which represent respective product sizes.

Each of the embodiments of the present disclosure includes allowing lighting the light sources in the intermediate, which is a work in progress, to measure the optical characteristics of the emitted light, and forming an optical characteristic correcting element in the intermediate and/or replacing certain light sources based on the measured optical characteristics. This can correct any luminance distribution or chromaticity distribution nonuniformity in the emission face attributable to manufacturing variances or the optical characteristic variations of the light sources. This as a result can reduce the individual differences (optical characteristics variations) among the light emitting module products, thereby producing light emitting modules having stable optical characteristics. Two or more of the embodiments described above can be implemented in combination.

Next, examples of light emitting modules and planar light sources manufactured by a method according to any of the embodiments of the present disclosure will be explained.

Twelfth Embodiment

Figure 17:
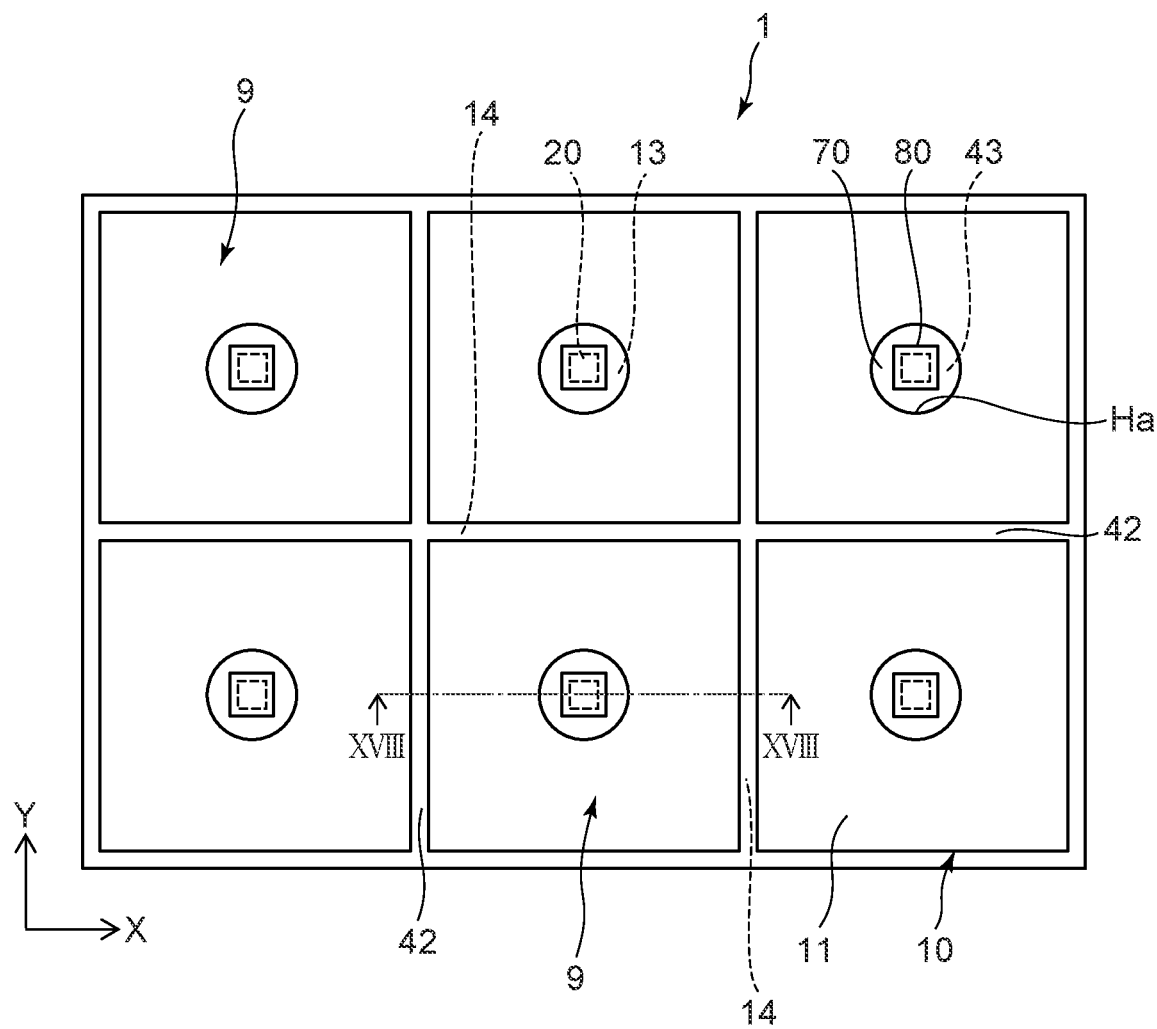
FIG. 17 is a schematic top view of a planar light source according to a twelfth embodiment of the present disclosure.

FIG. 17 is a schematic top view of a planar light source 1 according to a twelfth embodiment of the present disclosure.

The planar light source 1 can include one or more light sources 20. In the case in which the planar light source 1 has a plurality of light sources 20, each light source 20 is sectioned by sectioning grooves 14. A sectioned region is also referred to as an emission region 9. In the case in which the planar light source has a single light source 20, the planar light source has a single emission region 9.

An emission region 9 can be used as a driving unit for local dimming. FIG. 17 illustrates a planar light source 1 having six emission regions 9 arranged in two rows by three columns. The number of light sources 20 and the number of emission regions 9 making up a planar light source 1 are not limited to the those shown in FIG. 17. Arranging a plurality of planar light sources 1 can produce a planar light source device having a larger area.

In FIG. 17, the two directions paralleling the emission face of the planar light source 1 and orthogonal to one another are denoted as X and Y directions. The planar light source 1 has, for example, a rectangular outline having two sides extending along the X direction and two sides extending along the Y direction.

Figure 18:
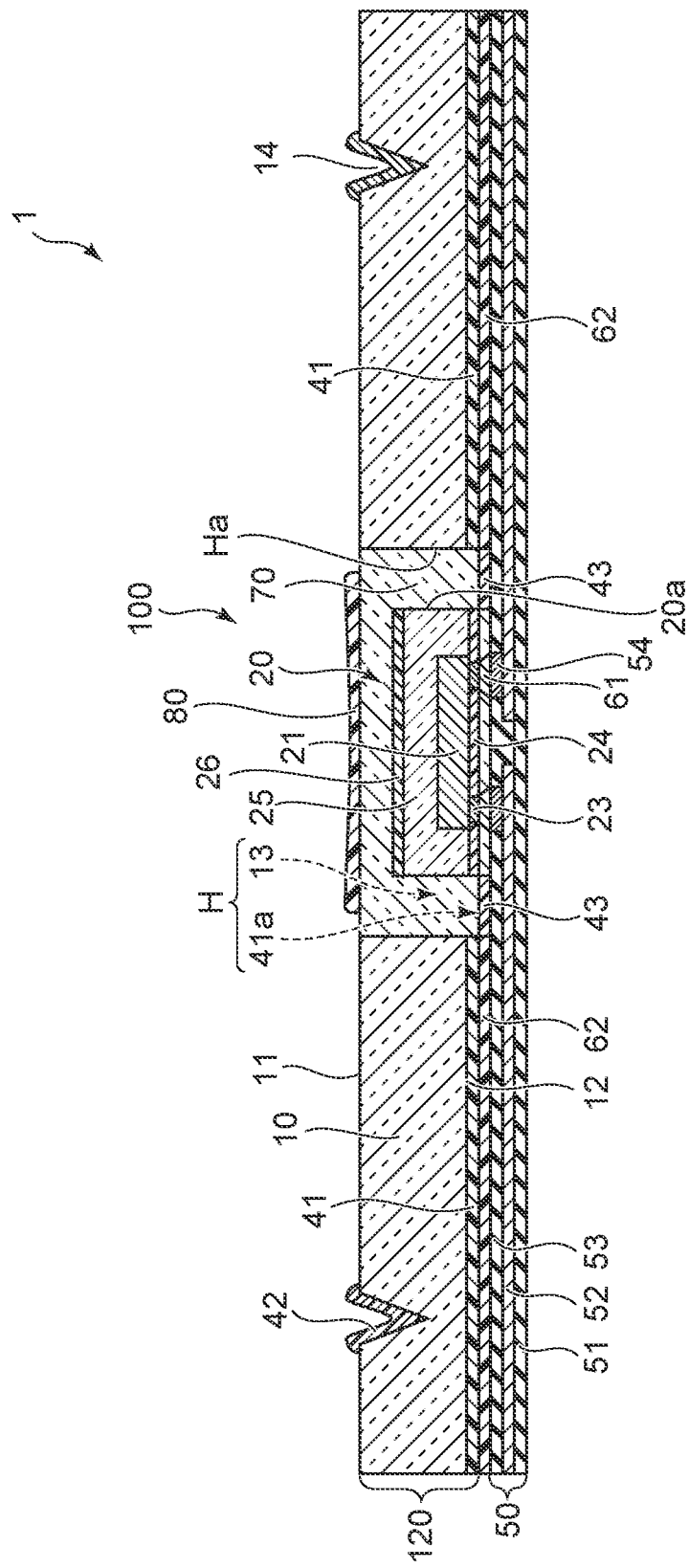
FIG. 18 is a schematic cross-sectional view taken along line XVIII-XVIII in FIG. 17.

FIG. 18 is a schematic cross-sectional view of a portion that includes one light source 20 taken along line XVIII-XVIII in FIG. 17. The planar light source 1 includes a light emitting module 100 and a wiring substrate 50.

The light emitting module 100 includes a stack structure 120 and light sources 20. The stack structure 120 includes a light guide 10 and a light reflecting member 41 disposed on the second principal face 12 of the light guide 10.

The light guide 10 includes first holes 13. The light reflecting member 41 includes second holes 41a at the positions overlapping the first holes 13. In other words, the stack structure 120 has through holes H each including a first hole 13 and a second hole 41a. The first hole 13 and the second hole 41a can have the same width (diameter). Alternatively, the width (diameter) of the first hole 13 can be larger or smaller than the width (diameter) of the second hole 41a. The first hole 13 and the second hole 41a can be circular or elliptical in a top view. The first hole 13 and the second hole 41a can be polygonal, such as triangular, quadrangular, hexagonal, octagonal, or the like in a top view. The centers of the first hole 13 and the second hole 41a preferably coincide with one another in a top view.

A light reflecting member 42 can be disposed in the sectioning grooves 14. The light reflecting member 42 preferably has a light reflectivity with respect to the light emitted by the light source 20. For the light reflecting member 42, for example, a white resin member made of a light transmissive resin containing a light diffusing agent can be used. Examples of light diffusing agents include microparticles of $TiO_2$, $SiO_2$, $Al_2O_3$, $ZrO_2$, ZnO and the like. Furthermore, as a light reflecting member 42, a light reflecting metal member, such as Al or Ag may be used. A member having a lower refractive index than that of the light guide 10 may be disposed in the sectioning grooves 14, or the inside may remain as an air layer.

The light sources 20 are disposed on the wiring substrate 50 in the through holes H of the stack structure 120. The light sources 20, for example, have the structure shown in FIG. 4A described earlier. The light sources 20 may have any of the structures shown in FIGS. 4B to 4Q.

The stack structure 120 is disposed on the wiring substrate 50. The second principal face 12 of the light guide 10 faces the wiring substrate 50, and the light reflecting member 41 is disposed between the second principal face 12 and the wiring substrate 50.

The light reflecting member 41 has a light reflectivity with respect to the light emitted by the light source 20. For example, for the light reflecting member 41, a sheet shaped resin member can be used. For the light reflecting member 41, a white resin member configured as a light transmissive resin material containing a large number of air bubbles can be used. Alternatively, for the light reflecting member 41, a white resin member configured as a light transmissive resin material containing a light diffusing agent can be used. Examples of light diffusing agents include microparticles of $TiO_2$, $SiO_2$, $Al_2O_3$, $ZrO_2$, ZnO and the like. For the resin material contained in the light reflecting member 41, for example, a thermoplastic resin, such as acrylic, polycarbonate, cyclic polyolefin, polyethylene terephthalate, or polyester, a thermosetting resin, such as epoxy or silicone can be used.

The light reflecting member 41 is adhered to the wiring substrate 50 via an adhesive layer 62. The adhesive layer 62 is a resin layer, such as an epoxy resin, acrylic resin, or olefin resin. In other words, the light guide 10 is disposed on the wiring substrate 50 via the adhesive layer 62 and the light reflecting member 41.

A light reflecting member 43 is disposed on the wiring substrate 50 around the light source 20 in each through hole H. The light reflecting member 43 has a light reflectivity with respect to the light emitted by the light source 20. The light reflecting member 43, for example, is a white resin member made of a light transmissive resin material containing as a light diffusing agent such as microparticles of $TiO_2$, $SiO_2$, $Al_2O_3$, $ZrO_2$, ZnO and the like.

In the top view shown in FIG. 19, the light reflecting member 43 is disposed on the wiring substrate 50 between the inner lateral face Ha of each through hole H and the lateral faces 20a of the light source 20.

The light transmissive member 70 described above is disposed in each through hole H. The light transmissive member 70 is disposed between the lateral faces 20a of the light source 20 and the inner lateral face Ha of each through hole H. The light transmissive member 70 can be disposed so as not to interpose a space such as an air layer between the lateral faces 20a of each light source 20 and the light transmissive member 70 and between the inner lateral face Ha of each through hole H and the light transmissive member 70.

The light transmissive member 70 is disposed on the light reflecting member 43 and on the light source 20, covering the light reflecting member 43 and the light source 20. The upper face of the light transmissive member 70 can be a flat surface. Alternatively, the upper face of the light transmissive member 70 can be a convexly or concavely curved surface. The light transmissive member 70 can be in contact with the entire inner lateral face Ha of each through hole H. Alternatively, the light transmissive member 70 can be disposed to expose a portion of the inner latera face 13 of each first hole 13 of the light guide 10. The light transmissive member 70 may include a portion extending from the through hole H onto the first principal face 11 of the light guide 10.

The wiring substrate 50 includes an insulation base 51 and a wiring layer 52 disposed on the insulation base 51. The wiring substrate 50 can further include a cover layer 53 having insulation properties to cover the wiring layer 52. The wiring substrate 50 can include a conductive part 54 electrically connected to the wiring layer 52. The insulation base 51 and the cover layer 53 can include a resin, such as polyimide, polyethylene naphthalate, polyethylene terephthalate or the like. The wiring layer 52 and the conductive parts 54 can include a metal, such as copper, aluminum, or the like.

The electrodes 23 of the light sources 20 are connected to the conductive parts 54 via conductive joining members 61. For the joining members 61, for example, solder such as Au—Sn, Au—Ag—Cu, or AuBi, or a metal paste, can be used.

The light transmissive member 70 may be disposed between the light source 20 and the wiring substrate 50 and around the joining members 61.

The light adjusting members 80 described above are disposed on the light transmissive members 70. The light adjusting members 80 can be disposed to cover the upper face of each light transmissive member 70 in whole or part. The light adjusting members 80, as shown in FIG. 17, are preferably disposed to overlap the light sources 20 in a top view. For example, the light adjusting members 80, as shown in FIG. 17, are squares larger than the square light sources 20. The light adjusting members 80 can be circular, triangular, hexagonal, octagonal, or the like in a top view. The light adjusting members 80 may be disposed not only on the upper faces of the light transmissive members 70, but also be extended onto the surrounding first principal face 11 of the of the light guide 10.

A portion of a light transmissive member 70 is interposed between the light adjusting member 26 on the upper face of each light source 20 and the light adjusting member 80 on the upper face of the light transmissive member 70. The light transmissive member 70 has a higher transmittance with respect to the light emitted by the light source 20 than that of the light adjusting members 26 and 80. The transmittance of the light transmissive member 70 with respect to the light emitted by the light source 20 can be set to 2 to 100 times the transmittance of the light adjusting members 26 and 80.

Each light adjusting member 26 scatters and reflects a portion of the light emitted from a light source 20 upwards while transmitting the other part. This can hinder the area immediately above the light source 20 in each emission region 9 of the planar light source 1 from having excessively higher luminance than the luminance of the other area. This, in other words, can reduce the luminance nonuniformity of the light exiting each emission region sectioned by the sectioning grooves 14.

Furthermore, each light adjusting member 80 is disposed on the light transmissive member 70 apart from the light adjusting member 26. A portion of the light transmissive member 70 having a higher transmittance than the light adjusting members 26 and 80 is interposed between the light adjusting member 26 and the light adjusting member 80. The emitted light from a light source 20 and the light reflected off of the light reflecting member 43 around the light source 20 is guided into the light transmissive member 70 between the light adjusting member 26 and the light adjusting member 80. A portion of the light guided into the light transmissive member 70 is scattered and reflected by the light adjusting member 80, while the other portion transmits through the light adjusting member 80. This can hinder the area immediately above a light source 20 from having excessively higher or lower luminance, and can as a result reduce the in-plane luminance nonuniformity in each emission region 9.

The light reflecting member 43 disposed on the wiring substrate 50 around the light source 20 in each through hole H can reduce the absorption of light in the area surrounding the light sources 20.

The light reflecting member 41 disposed on the second principal face 12 of the light guide 10 reflects the light that is being guided through the light guide 10 towards the second principal face 12 to the first principal face 11 which is the emission face of the planar light source 11, thereby increasing the luminance of the light extracted from the first principal face 11.

Between the light reflecting member 41 and the first principal face 11, the light from the light source 20 is guided through the light guide 10 towards the sectioning grooves 14 while repeating total internal reflection off of the light reflecting member 41 and the first principal face 11. A portion of the light advancing towards the first principal face 11 is extracted from the light guide 10 through the first principal face 11.

Thirteenth Embodiment

Figure 20:
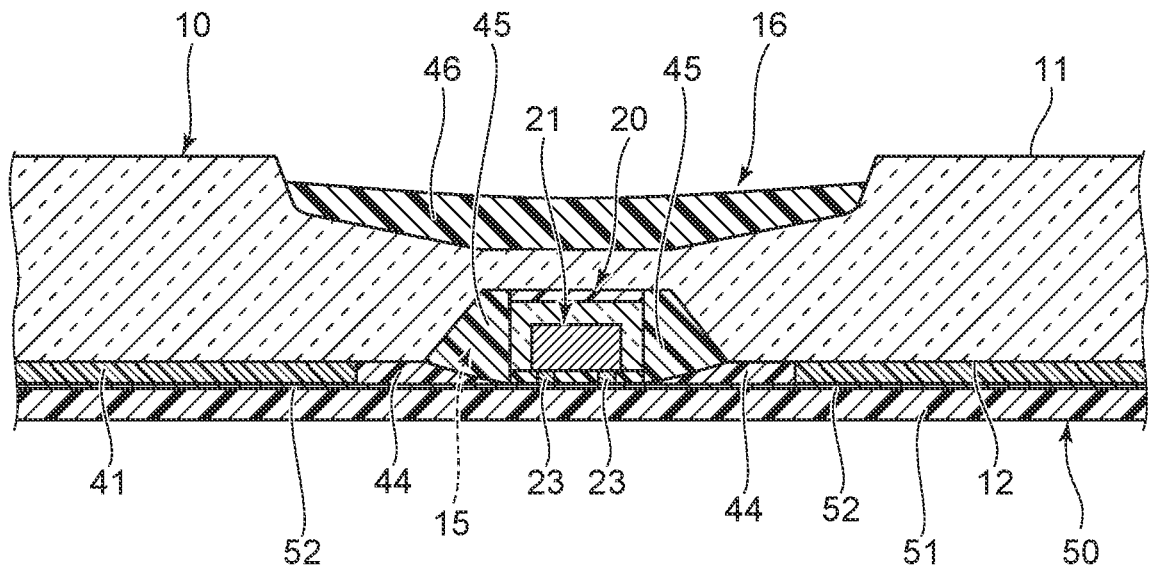
FIG. 20 is a schematic cross-sectional view of a planar light source according to a thirteenth embodiment of the present disclosure.

FIG. 20 is a schematic cross-sectional view of a planar light source according to a thirteenth embodiment of the present disclosure. FIG. 20 is a cross section of a portion and its vicinity of the planar light source in which a light source 20 is disposed.

The light guide 10, similar to the structure shown in FIG. 3B described earlier, includes recesses 15 which are open on the second principal face 12. The light sources 20 are disposed in the recesses 15. A light reflecting member 45 is disposed between the inner lateral face of each recess 15 and the lateral faces of the light source 20 disposed therein. The light reflecting member 45, for example, is a white resin member made of a light transmissive resin material containing a light diffusing agent. Each light source 20 is fixed to the light guide 10 via the light reflecting member 45.

A recess 16 is created in the first principal face 11 of the light guide 10 at the position corresponding to each recess 15, and a light adjusting member 46 is disposed in the recess 16. The light adjusting member 46 is composed similarly to the light adjusting member 80 described earlier.

Similar to the twelfth embodiment, a light reflecting member 41 is disposed on the second principal face 12 of the light guide 10. The light reflecting member 41 is disposed between the wiring substrate 50 and the second principal face 12 of the light guide 10. The electrodes 23 of each light emitting element 21 are connected to the wiring layer 52 of the wiring substrate 50.

A light reflecting member 44 is disposed on the second principal face 12 around each light source 20 and on the lower face of the light reflecting member 45. The light reflecting member 44, for example, is a white resin member configured as a light transmissive resin material containing a light diffusing agent.

Fourteenth Embodiment

FIG. 21A to FIG. 21E are schematic top views of light adjusting members 81 and 82 according to a fourteenth embodiment of the present disclosure.

The light guide 10 includes sectioning grooves 14 compartmentalizing regions (emission regions) each including at least one light source 20. As a process of forming an optical characteristic correcting element based on the measured optical characteristics, disposing second light adjusting members 82 in the areas around the sectioning grooves 14 is included. FIG. 21A to FIG. 21E show examples in which a first light adjusting member 81 is disposed above each light source 20. The first light adjusting members 81 above the light sources 20 and the second light adjusting members 82 around the sectioning grooves 14 may be formed in the same process or different processes. Alternatively, an intermediate already provided with either the first light adjusting members 81 or the second light adjusting members 82 can be provided, followed by measuring the optical characteristics, and then disposing one or both of the first and second light adjusting members 81 and 82.

The first light adjusting members 81 and the second light adjusting members 82 can be formed on the first principal face 11 of the light guide 10, for example, by printing or ink-jetting a light reflecting resin which will become the first light adjusting members 81 and/or the second light adjusting members 82 at predetermined positions by using a mask having openings at predetermined positions, followed by hardening the material.

Such a method of forming the first and second light adjusting members 81 and 82 using a mask requires the following provision before measuring the optical characteristics. First, with regard to the luminance characteristics among optical characteristics, in particular, a few luminance patterns are estimated. For example, by estimating three luminance characteristic patterns in terms of the difference between the luminance in the vicinity of the light source and the luminance in the sectioning grooves of more than 10%, 5% to 10%, and less than 5%, the positions and the shapes of the second light adjusting members 82 for correction purposes are determined to provide three masks. After measuring the optical characteristics, second light adjusting members 82 are disposed by using the mask determined as applicable. This can reduce the time needed to determine how the correction should be made, thereby improving the takt time. Using a mask can reduce the time to dispose dot shaped second light adjusting members 82 as compared to, for example, disposing them individually. A larger number of luminance characteristics patterns than the three luminance characteristics patterns described above can be established. The larger the number of luminance characteristics patterns and the corresponding mask opening patterns, the easier it is to reduce the optical characteristics variation after correction. Different elements per light source or emission region may be formed individually without using a mask.

In the case of presetting luminance characteristics patterns as described above, instead of using a mask, for example, the first and second light adjusting members 81 and 82 obtained by forming and hardening a resin material using a prescribe pattern on a transfer sheet may be used. In other words, unlike the method of forming first and second light adjusting members 81 and 82 by hardening a resin material on the light guide 10, the elements may be formed by transferring first and second light adjusting members 81 and 82 that are already hardened.

The first and second light adjusting members 81 and 82, similar to the light adjusting members 80 described earlier, have a light reflectivity and transmissivity with respect to the light emitted by the light sources 20. The first and second light adjusting members 81 and 82 can be made of a light transmissive resin and a light diffusing agent dispersed in the light transmissive resin. The light transmissive resin is, for example, silicone or epoxy. Examples of light diffusing agents include microparticles of $TiO_2$, $SiO_2$, $Al_2O_3$, $ZrO_2$, ZnO and the like.

The transmittance of the first light adjusting member 81 and the transmittance of the second light adjusting members 82 can be selected based on the ratio of the luminance above the light sources 20 to the luminance above the sectioning grooves 14 as the optical characteristics, for example, so as to reduce the difference between the luminance above the light source 20 and the luminance above the sectioning grooves 14. The transmittance of the light adjusting members 81 and 82 can be changed, for example, by varying the thicknesses of the light adjusting members 81 and 82 and the concentration of the light diffusing agent.

The first light adjusting member 81 covers the entire upper face of the light source 20 as well as the area around the light source 20 (the area between the light source 20 and the inner lateral face of the first hole 13).

One or more second light adjusting members 82 can be disposed in one emission region. Each second light adjusting member 82 may be dot or stripe shaped. Specific examples of dot shapes include a circle, ellipse, track, or any of the variations of these, any of these shapes missing a portion, or any shape combining portions of these shapes. All or some of the second light adjusting members 82 can have the same shape and size. In the examples shown in FIG. 21A to FIG. 21D, the second light adjusting members 82 include dots. By varying the coverage of the dot shaped second light adjusting members 82 per unit area of the first principal face 11 (or the percentage of the area not covered by the dot shaped second light adjusting members 82, i.e., opening) based on the measured optical characteristics, the transmittance (luminance) of the areas above and around the sectioning grooves 14 can be adjusted.

Figure 21A:
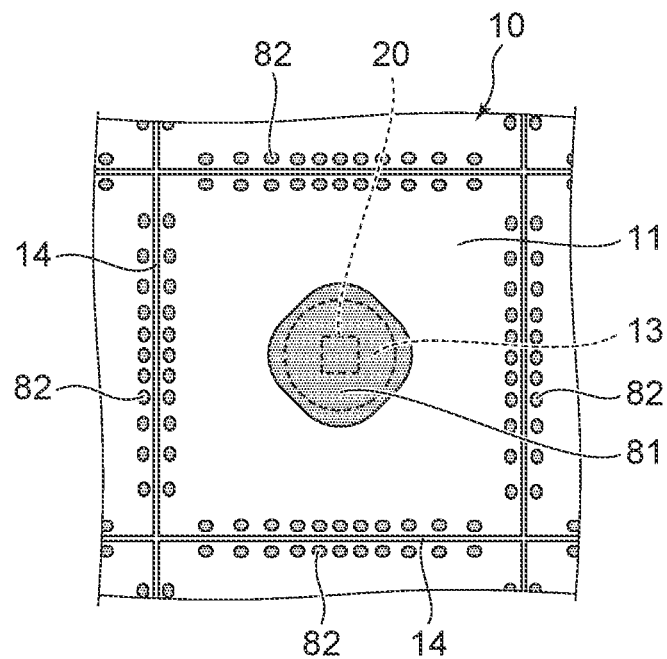
FIG. 21A is a schematic top view of a light adjusting member according to a fourteenth embodiment of the present disclosure.
Figure 21B:
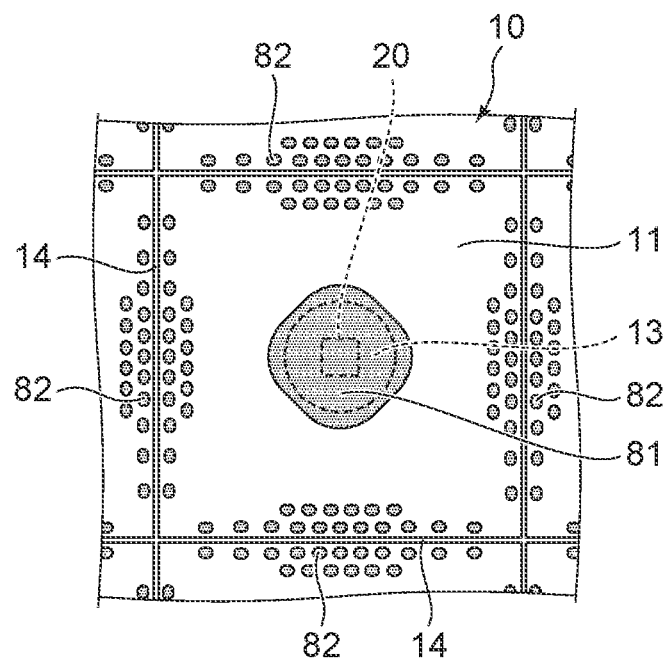
FIG. 21B is a schematic top view of a light adjusting member according to the fourteenth embodiment of the present disclosure.

In the examples shown in FIG. 21A and FIG. 21B, the dot shaped second light adjusting members 82 are arranged along the sectioning grooves 14 lengthwise. In the example shown in FIG. 21B, the number (or the density) of the dot shaped second light adjusting members 82 in the central portion of each sectioning groove 14 lengthwise is increased as compared to the example shown in FIG. 21A. This can reduce the difference between the luminance in the corners defined by the sectioning grooves 14 and the luminance in the central portions of the sectioning grooves 14 lengthwise, which tends to be higher than that of the corners. FIG. 21A to FIG. 21D show the cases in which the second light adjusting members 82 are formed using the same pattern for the emission region in the center of the drawing and the adjacent emission regions. Not limited to this, depending on the optical characteristics of each emission region, the first light adjusting members 81 and the second light adjusting members 82 having different shapes or patterns can be formed in adjacent emission regions.

Figure 21C:
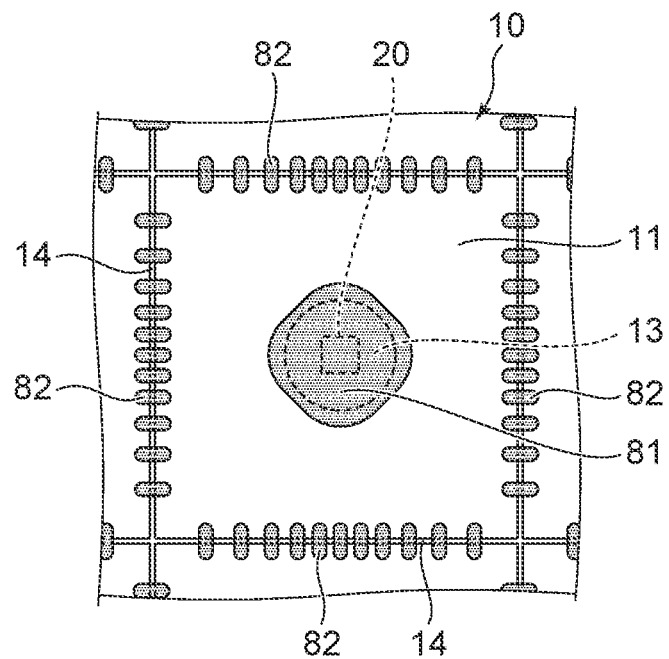
FIG. 21C is a schematic top view of a light adjusting member according to the fourteenth embodiment of the present disclosure.
Figure 21D:
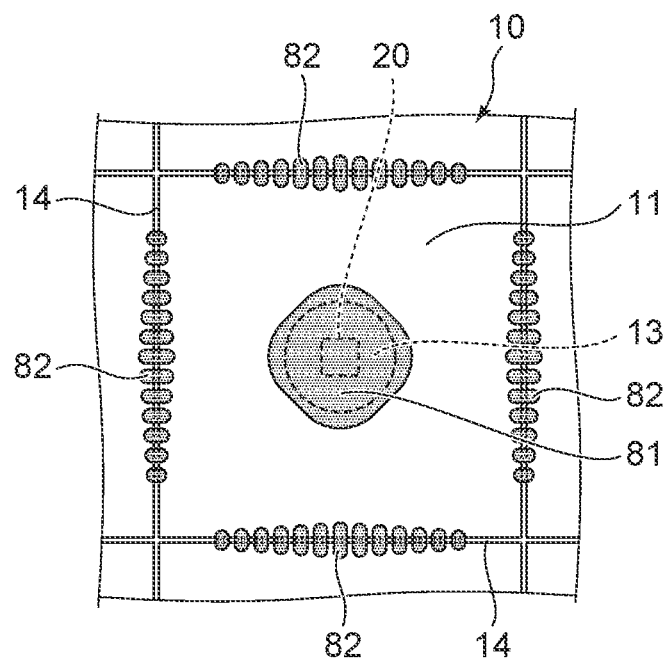
FIG. 21D is a schematic top view of a light adjusting member according to the fourteenth embodiment of the present disclosure.

In the examples shown in FIG. 21C and FIG. 21D, track shaped second light adjusting members 82 are arranged each crossing the sectioning grooves 14 widthwise. When the sectioning grooves 14 have bottoms as shown in FIG. 6B, for example, the second light adjusting members 82 can be continuously formed from the upper face of the light guide 10 to the parts of lateral faces of the light guide 10 defining the sectioning grooves 14.

In the case of using already hardened second light adjusting members 82 or using a high viscosity resin material for the second light adjusting members 82, the second light adjusting members 82 can be provided so as not to be in contact with the lateral faces of the light guide 10 that define the sectioning grooves 14.

The example shown in FIG. 21D, in which the lengths of the second light adjusting members 82 widthwise increase towards the center of the sectioning grooves 14 lengthwise, can reduce the difference between the luminance in the center of the dividing grooves 14 lengthwise and the luminance in the corners of the sectioning grooves 14.

Figure 21E:
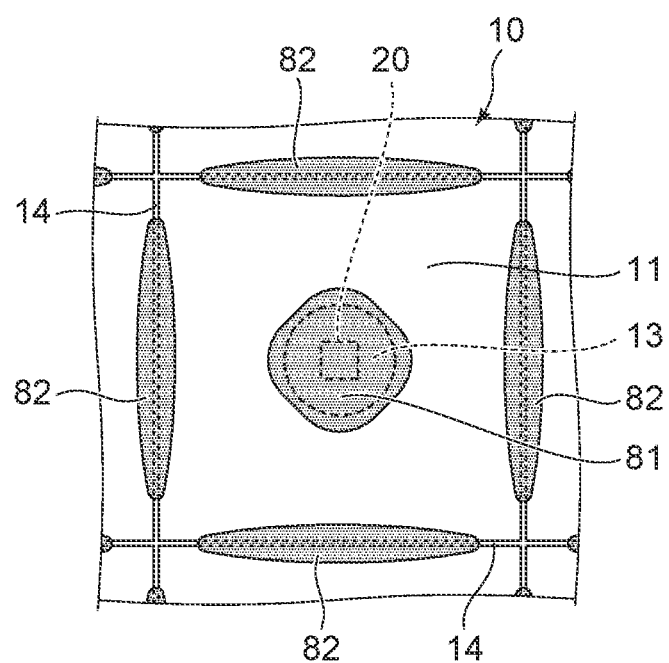
FIG. 21E is a schematic top view of a light adjusting member according to the fourteenth embodiment of the present disclosure.

In the example shown in FIG. 21E, the second light adjusting members 82 are continuously disposed along the sectioning grooves 14 lengthwise. By increasing the width of the second light adjusting members 82 towards the center lengthwise, the luminance difference between the center of the dividing grooves 14 lengthwise and the corners can be reduced. Similar to the second light adjusting members 82 shown in FIG. 21C and FIG. 21D, the second light adjusting members 82 can be formed to be in contact only with the upper face of the light guide 10, or may be formed continuously from the upper face of the light guide 10 to the parts of light guide 10 defining the lateral faces of the sectioning grooves 14.

In addition to the first light adjusting member 81 which covers the area above a light source 20 and a first hole 13, dot shaped members may further be formed in the periphery thereof. The dot shaped portions can hinder the periphery of the light source 20 from becoming excessively luminous.

The first light adjusting members 81 and the second light adjusting members 82 shown in FIG. 21A to FIG. 21E may be disposed on the optical member (e.g., a diffusion sheet) 200 opposing the first principal face 11 of the light guide 10 shown in FIG. 5B described earlier.

For example, a number of masks having each of the patterns of the second light adjusting members 82 shown in FIG. 21A to FIG. 21E can be provided beforehand, and the second light adjusting members 82 can be printed on a light guide 10 or a diffusion sheet by using the appropriate mask selected based on the measured optical characteristics. Alternatively, a number of diffusion sheets on which the second light adjusting members 82 of each of the patterns shown in FIG. 21A to FIG. 21E are printed can be provided, and an appropriate diffusion sheet can be selected to be combined with a light guide 10 based on the measured optical characteristics. Diffusion sheets can be provided separately from an intermediate. This as a result can reduce the time for manufacturing a light emitting module.

As a first example of the fourteenth embodiment, based on the luminance measurement of the light guide 10 not provided with any first light adjusting member 81 or second light adjusting member 82, a combination of the first light adjusting members 81 to be disposed above the light sources 20 and the second light adjusting members 82 to be disposed around sectioning grooves 14 is selected.

As a second example of the fourteenth embodiment, the first light adjusting members 81 are disposed on the light guide 10 above the light sources 20, and a number of diffusion sheets are provided by disposing second light adjusting members 82 in the positions corresponding to the sectioning grooves 14 using various patterns. Based on the measured luminance of the light guide 10 provided with the first light adjusting member 81, a diffusion sheet having the pattern of the second light adjusting members 82 to be combined with the light guide 10 is selected.

As a third example of the fourteenth embodiment, the luminance is measured after combining a light guide 10 which has first light adjusting members 81 disposed above the light sources 20 and a diffusion sheet, and based on the measurements, a pattern of the second light adjusting members 81 is selected to be disposed on the first principal face 11 of the light guide 10 around the sectioning grooves 14.

As a fourth example of the fourteenth embodiment, second light adjusting members 82 are disposed around the sectioning grooves 14 of a light guide 10, and a number of diffusion sheets each having first light adjusting members 81 positioned above and corresponding to the light sources 20 using various patterns are provided. Based on the measured luminance of the light guide 10 having the second light adjusting members 82, a diffusion sheet having the first light adjusting members 81 to be combined with the light guide 10 is selected.

As a fifth example of the fourteenth embodiment, the luminance is measured after combining a diffusion sheet having second light adjusting members 82 disposed in the positions corresponding to the sectioning grooves 14 and a light guide 10 not provided with any first light adjusting member 81 or second light adjusting member 82, and based on the measurements, the first light adjusting members 81 to be disposed above the light sources 20 of the light guide 10 are selected.

In the foregoing, certain embodiments of the present invention have been explained with reference to specific examples. The present invention, however, is not limited to these specific examples. All forms implementable by a person skilled in the art by suitably making design changes based on any of the embodiments of the present invention described above also fall within the scope of the present invention so long as they encompass the subject matter of the present invention. Furthermore, various modifications and alterations within the spirit of the present invention that could have been made by a person skilled in the art also fall within the scope of the present invention.

What is claimed is:

1. A method of manufacturing a light emitting module comprising:
   providing an intermediate, the intermediate including:
      a light guide having a first principal face and a second principal face opposing the first principal face,
      a plurality of light sources disposed on the second principal face of the light guide, and
      a wiring layer disposed on the second principal face and electrically connected to the plurality of light sources;
   allowing the plurality of light sources in the intermediate to emit light and measuring optical characteristics of the emitted light; and
   after the measuring, forming an optical characteristic correcting element in the intermediate based on the measured optical characteristics.

2. The method of manufacturing a light emitting module according to claim 1, wherein the process of forming the optical characteristic correcting element includes forming a plurality of sectioning grooves on the light guide to compartmentalize regions including at least one of the plurality of light sources.

3. The method of manufacturing a light emitting module according to claim 1, wherein
the light guide includes a plurality of sectioning grooves compartmentalizing regions including at least one of the plurality of light sources, and
the process of forming the optical characteristic correcting element includes forming a light adjusting hole in the light guide between one of the plurality of sectioning grooves and one of the plurality of light sources in a top view.

4. The method of manufacturing a light emitting module according to claim 1, wherein
the process of forming the optical characteristic correcting element includes forming a light adjusting member above at least one of the plurality of light sources, the light adjusting member reflecting at least a portion of the light emitted by the at least one of the plurality of light sources.

5. The method of manufacturing a light emitting module according to claim 1, wherein
the process of forming the optical characteristic correcting element includes forming a phosphor layer above or in a vicinity of at least one of the plurality of light sources.

6. The method of manufacturing a light emitting module according to claim 1, wherein
the intermediate further includes a wiring substrate including an insulation base that supports the wiring layer,
the light guide is disposed on the wiring substrate such that the second principal face faces the wiring substrate,
the light guide has a plurality of first holes extending through from the first principal face to the second principal face, and
the light sources are disposed on the wiring substrate in the first holes.

7. The method of manufacturing a light emitting module according to claim 6, wherein
the process of forming the optical characteristic correcting element includes forming a light reflecting member on the wiring substrate between an inner lateral face of at least one of the plurality of first holes and a lateral face of at least one of the plurality of light sources disposed therein.

8. The method of manufacturing a light emitting module according to claim 7, wherein
at least one of the plurality of first holes includes:
a first region having a first distance between the inner lateral face of the first hole and the lateral face of the light source disposed therein; and
a second region having a second distance which is larger than the first distance between the inner lateral face of the first hole and another lateral face of the light source disposed therein, and
the light reflecting member is formed on the wiring substrate in the first region.

9. The method of manufacturing a light emitting module according to claim 7, wherein
the light guide has:
a third region having a third distance between adjacent ones of the plurality of light sources; and
a fourth region having a fourth distance which is larger than the third distance between other adjacent ones of the plurality of light sources, and the light reflecting member is formed on the wiring substrate in the third region.

10. The method of manufacturing a light emitting module according to claim 6, wherein
at least one of the plurality of first holes includes:
a first region having a first distance between the inner lateral face of the first hole and a lateral face of the light source disposed therein; and
a second region having a second distance which is larger than the first distance between the inner lateral face of the first hole and another lateral face of the light source disposed therein, and
the process of forming the optical characteristic correcting element includes forming a groove in a part of the light guide on a first region side in a cross section that includes the first region, the second region, and the light source located between the first region and the second region.

11. The method of manufacturing a light emitting module according to claim 10, further comprising forming a light reflecting member in the grooves.

12. The method of manufacturing a light emitting module according to claim 6, wherein
the light guide has:
a third region having a third distance between adjacent ones of the plurality of light sources; and
a fourth region having a fourth distance which is larger than the third distance between other adjacent ones of the plurality of light sources, and
the process of forming the optical characteristic correcting element includes forming a groove in the light guide in the third region at a position closer to one of the adjacent ones of the plurality of light sources than to a midpoint between the adjacent ones of the plurality of light sources.

13. The method of manufacturing a light emitting module according to claim 6, wherein
the process of forming the optical characteristic correcting element includes forming a light transmissive member in at least one of the plurality of first holes.

14. The method of manufacturing a light emitting module according to claim 13, wherein
a refractive index of the light transmissive member is selected based on the measured optical characteristics.

15. The method of manufacturing a light emitting module according to claim 13, wherein
the process of forming the optical characteristic correcting element includes forming an oblique face oblique to the first principal face at an upper face of the light transmissive member.

16. The method of manufacturing a light emitting module according to claim 13, wherein
the process of forming the optical characteristic correcting element further includes forming a groove in the light transmissive member.

17. The method of manufacturing a light emitting module according to claim 16, wherein
the process of forming the optical characteristic correcting element further includes forming a light reflecting member in the groove of the light transmissive member.

18. The method of manufacturing a light emitting module according to claim 1, further comprising, based on the measured optical characteristics, replacing one of the plurality of light sources with other one of the plurality of light sources together with a portion of the light guide surrounding the light source.

19. The method of manufacturing a light emitting module according to claim 1, wherein
the light guide has recesses that are open on a second principal face side, and
at least some of the plurality of light sources are disposed in the recesses.

20. The method of manufacturing a light emitting module according to claim 1, wherein
the light guide includes sectioning grooves compartmentalizing regions including at least one of the plurality of light sources, and
the process of forming the optical characteristic correcting element includes disposing at least one light adjusting member, based on the measured optical characteristics, above the light sources and in the periphery of the sectioning grooves, the at least one light adjusting member having light reflectivity and transmissivity with respect to the light emitted by a corresponding one of the plurality of light sources.

21. The method of manufacturing a light emitting module according to claim 20, wherein the measured optical characteristics include a ratio of a luminance above the light sources to a luminance above the sectioning grooves.

22. The method of manufacturing a light emitting module according to claim 20, wherein a light transmittance of the at least one light adjusting member is selected based on the measured optical characteristics.

23. The method of manufacturing a light emitting module according to claim 20, wherein
at least one of the light adjusting members has a dot shape, and
a coverage of the dot shaped light adjusting member is selected based on the measured optical characteristics.

24. The method of manufacturing a light emitting module according to claim 20, wherein the at least one light adjusting member is disposed on the first principal face of the light guide.

25. The method of manufacturing a light emitting module according to claim 20, wherein the at least one light adjusting member is disposed on an optical member disposed so as to face the first principal face of the light guide.

26. The method of manufacturing a light emitting module according to claim 1, wherein the optical characteristics comprises a luminance distribution, a chromaticity distribution, or a combination thereof.

27. A method of manufacturing a light emitting module comprising:
providing an intermediate, the intermediate including:
a wiring substrate,
a light guide having a first principal face and a second principal face opposing the first principal face, wherein the light guide is disposed so as to face the wiring substrate, and in the light guide, a plurality of first holes extend through from the first principal face to the second principal face, and
a plurality of light sources disposed on the wiring substrate in the first holes;
allowing the plurality of light sources in the intermediate to emit light and measuring the optical characteristics of the emitted light; and
after the measuring, replacing, based on the measured optical characteristics, one of the plurality of light sources with other one of the plurality of light sources on the wiring substrate.

28. The method of manufacturing a light emitting module according to claim 27, further comprising:
measuring a position of the plurality of light sources on the wiring substrate;
replacing, based on the measured position, one of the plurality of light sources with other one of the plurality of light sources on the wiring substrate.

29. A method of manufacturing a light emitting module comprising:
providing an intermediate, the intermediate including a wiring substrate and a plurality of light sources disposed on the wiring substrate;
allowing the plurality of light sources in the intermediate to emit light and measuring the optical characteristics of the emitted light;
after the measuring, replacing, based on the measured optical characteristics, one of the plurality of light sources with other one of the plurality of light sources on the wiring substrate; and
subsequent to replacing the light source, disposing on the wiring substrate a light guide that has a first principal face and a second principal face opposing the first principal face and facing the wiring substrate, such that the second principal face faces the wiring substrate.

30. The method of manufacturing a light emitting module according to claim 29, further comprising
prior to the process of disposing the light guide on the wiring substrate, measuring positions of the light sources on the wiring substrate, and
based on the measured positions of the light sources, replacing one of the light sources with other one of the light sources on the wiring substrate.

* * * * *